US011755852B2

(12) United States Patent
Pandey et al.

(10) Patent No.: US 11,755,852 B2
(45) Date of Patent: *Sep. 12, 2023

(54) METHODS AND SYSTEMS OF RADIO FREQUENCY IDENTIFICATION (RFID) COMMUNICATION

(71) Applicant: Intermec IP Corporation, Fort Mill, SC (US)

(72) Inventors: Pankaj Kumar Pandey, Bangalore (IN); Gourango Lal Biswas, Bangalore (IN); Rene Martinez, Seattle, WA (US)

(73) Assignee: INTERMEC IP CORPORATION, Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,272

(22) Filed: Jul. 7, 2022

(65) Prior Publication Data
US 2022/0343088 A1 Oct. 27, 2022

Related U.S. Application Data

(63) Continuation of application No. 16/984,372, filed on Aug. 4, 2020, now Pat. No. 11,416,694.

(51) Int. Cl.
*G06K 7/10* (2006.01)
*G06K 19/07* (2006.01)

(52) U.S. Cl.
CPC ..... *G06K 7/10475* (2013.01); *G06K 7/10039* (2013.01); *G06K 7/10099* (2013.01); *G06K 7/10316* (2013.01); *G06K 19/0723* (2013.01)

(58) Field of Classification Search
CPC .............. G06K 7/10475; G06K 7/10039
(Continued)

(56) References Cited

U.S. PATENT DOCUMENTS 7,872,581 B2 * 1/2011 Darianian .......... G06K 7/10356
340/572.1
9,104,925 B2 8/2015 Manzi
(Continued)

FOREIGN PATENT DOCUMENTS

EP          1725889 A1    11/2006
WO    2005/091013 A1    9/2005
WO    2008/104981 A2    9/2008

OTHER PUBLICATIONS

Extended European search report dated Jan. 7, 2022 for EP Application No. 21186825, 6 pages.
(Continued)

*Primary Examiner* — Allyson N Trail
(74) *Attorney, Agent, or Firm* — Alston & Bird LLP

(57) ABSTRACT

Various embodiments illustrated herein disclose a method. The method includes receiving, by a first radio-frequency identification (RFID) tag in an RFID reader, a first interrogation command from another RFID reader. The method includes transmitting, by the first RFID tag in the RFID reader, a first response signal to the other RFID reader in response to the reception of the first interrogation command. The method further includes transmitting, by a processor in the RFID reader, a second interrogation command to one or more second RFID tags, where the transmission of the second interrogation command is concurrent to the reception of the first interrogation command or the transmission of the first response signal.

20 Claims, 17 Drawing Sheets

(58) Field of Classification Search
USPC .......................................................... 235/451
See application file for complete search history.

(56) References Cited

U.S. PATENT DOCUMENTS

| | | | |
|---|---|---|---|
| 11,416,694 | B2 | 8/2022 | Pandey et al. |
| 2006/0022801 | A1 | 2/2006 | Husak et al. |
| 2006/0124737 | A1* | 6/2006 | Oh .................... G07F 7/1008 340/572.1 |
| 2008/0186145 | A1 | 8/2008 | Manley et al. |
| 2009/0085738 | A1 | 4/2009 | Darianian et al. |
| 2011/0133901 | A1 | 6/2011 | Strzelczyk et al. |
| 2014/0306804 | A1* | 10/2014 | Stiefel ................ G06K 7/10475 340/10.1 |
| 2016/0026835 | A1 | 1/2016 | Manzi |
| 2019/0220635 | A1* | 7/2019 | Yeh .................... G06K 19/0717 |
| 2019/0250634 | A1* | 8/2019 | Khong ................ G05D 1/0268 |
| 2020/0372449 | A1* | 11/2020 | Tarrant ................ G06Q 20/203 |
| 2021/0065529 | A1* | 3/2021 | Bergman ............. H04W 4/021 |

OTHER PUBLICATIONS

Final Office Action received for U.S. Appl. No. 16/984,372, dated Feb. 1, 2022, 7 pages.
Non-Final Office Action received for U.S. Appl. No. 16/984,372, dated Sep. 9, 2021, 8 pages.
Notice of Allowance received for U.S. Appl. No. 16/984,372, dated Apr. 8, 2022, 8 pages.
Intention to grant dated Jun. 21, 2023 for EP Application No. 21186825, 9 page(s).

* cited by examiner

METHODS AND SYSTEMS OF RADIO FREQUENCY IDENTIFICATION (RFID) COMMUNICATION

CROSS-REFERENCE TO RELATED APPLICATIONS

This application claims priority to and is a continuation application of U.S. application Ser. No. 16/984,372, filed Aug. 4, 2020, entitled, "Methods and Systems of Radio Frequency Identification (RFID) Communication", the entire contents of each of which are incorporated herein by reference.

TECHNICAL FIELD

Example embodiments of the present disclosure relate generally to radio-frequency identification (RFID) communication and, more particularly, to methods and systems of RFID communication.

BACKGROUND

A RFID system may be at least used for asset tracking, where one or more RFID tags may be placed on one or more assets that are to be tracked. For example, the RFID system may include multiple RFID readers that may be positioned at fixed locations in a workplace (where the one or more assets are to be tracked).

However, existing RFID systems are plagued by technical challenges and limitations. For example, some RFID systems may fail to communicate data and/or information among devices of the RFID systems in the event of a power outage.

BRIEF SUMMARY

Various embodiments illustrated herein disclose a method. The method includes receiving, by a first radio-frequency identification (RFID) tag of a second RFID reader, a first interrogation command from a first RFID reader. The method includes transmitting, by the first RFID tag of the second RFID reader, a first response signal to the first RFID reader, in response to the reception of the first interrogation command. The method further includes transmitting, by a processor in the RFID reader, a second interrogation command to one or more second RFID tags, where the transmission of the second interrogation command is concurrent to the reception of the first interrogation command or the transmission of the first response signal The various embodiments illustrated herein disclose the method where in response to the reception of the first interrogation command, interrupting, by the first RFID tag in the second RFID reader, a memory unit shared with the processor to retrieve data in accordance with a first protocol.

The various embodiments illustrated herein disclose transforming the retrieved data in accordance with a second protocol, wherein the second protocol is utilized to transmit the first response signal to the first RFID reader, wherein the first response signal includes the transformed data.

The various embodiments illustrated herein disclose the method wherein the first interrogation command is received in accordance with a second protocol, wherein the first interrogation command comprises a unique ID and an address associated with a memory unit in the second RFID reader.

The various embodiments disclosed herein describe retrieving, by the first RFID tag, a unique ID associated with the second RFID reader from the memory unit; comparing, by the first RFID tag, the unique ID retrieved from the memory unit with the unique ID received in the first interrogation command; and Various embodiments disclosed herein describe determining that the unique ID retrieved from the memory unit matches the unique ID received in the first interrogation command, transmitting, by the first RFID tag, the first response signal.

Various embodiments disclosed herein describe retrieving data from the memory unit from the address associated with the memory unit.

Various embodiments disclosed herein describe receiving data from the one or more second RFID tags, in response to the transmission of the second interrogation command, wherein the data from the one or more second RFID tags are stored in a memory unit shared between the processor of the second RFID reader and the first RFID tag of the second RFID reader.

Various embodiments disclosed herein describe removing interference between the reception of the first interrogation command and the transmission of the second interrogation command.

Various embodiments disclosed herein describe removing the interference comprises: phase shifting a signal carrying the second interrogation command; and adding the phase shifted signal to another signal carrying the first interrogation command.

Various embodiments illustrated herein disclose an RFID reader that includes a first RFID tag including a first antenna element, the first RFID tag is configured to receive a first interrogation command from another RFID reader, through the first antenna element. The first RFID tag is further configured to, in response to receiving the first interrogation command, transmit a first response signal to the other RFID reader. The RFID reader includes, a second antenna element and a processor communicatively coupled to the second antenna element. The processor configured to transmit a second interrogation command to one or more second RFID tags, where the reception of the second interrogation command is concurrent to the reception of the first interrogation command or transmission of the first response signal.

Various embodiments illustrated herein disclose the RFID reader, wherein the first RFID tag is configured to interrupt a memory unit shared with the processor to retrieve data in accordance with a first protocol.

Various embodiments illustrated herein disclose the RFID reader, wherein the first RFID tag is further configured to transform the retrieved data in accordance with a second protocol, wherein the second protocol is utilized to transmit the first response signal to the first RFID reader, wherein the first response signal includes the transformed data.

Various embodiments illustrated herein disclose the RFID reader, wherein the first interrogation command is received in accordance with a second protocol, wherein the first interrogation command includes a unique ID, and an address associated with a memory unit in the RFID reader.

Various embodiments illustrated herein disclose the RFID reader, wherein the first RFID tag is configured to: retrieve a unique ID associated with the second RFID reader from the memory unit; compare the unique ID retrieved from the memory unit with the unique ID received in the first interrogation command; and in response to determining that the unique ID retrieved from the memory unit matches the unique ID received in the first interrogation command, transmit the first response signal.

Various embodiments illustrated herein disclose the RFID reader, wherein the first RFID tag is configured to retrieve data from the memory unit from the address associated with the memory unit.

Various embodiments illustrated herein disclose the RFID reader, wherein the processor is configured to receive the data from the one or more second RFID tags, in response to the transmission of the second interrogation command, wherein the data from the one or more second RFID tags are stored in a memory unit shared between the processor and the first RFID tag.

Various embodiments illustrated herein disclose The RFID reader, wherein the RFID reader comprises a noise cancellation circuit that is configured to remove interference between the reception of the first interrogation command and the transmission of the second interrogation command.

Various embodiments illustrated herein disclose the RFID reader, wherein the noise cancellation circuit is configured to: remove the interference by phase shifting a signal carrying the second interrogation command; and add the phase shifted signal to another signal carrying the first interrogation command.

Various embodiments illustrated herein disclose a method that includes transmitting, by a processor in a first RFID reader, a first interrogation command to a second RFID reader. The method includes receiving, by the processor in the first RFID reader, a first response signal from the second RFID reader, in response to the transmission of the first interrogation command. The method further includes transmitting, by the processor in the RFID reader, a second interrogation command to one or more second RFID tags, where the transmission of the second interrogation command is concurrent to receiving the first response signal or transmitting the first interrogation command.

The foregoing illustrative summary, as well as other exemplary objectives and/or advantages of the disclosure, and the manner in which the same may be accomplished, may be further explained in the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
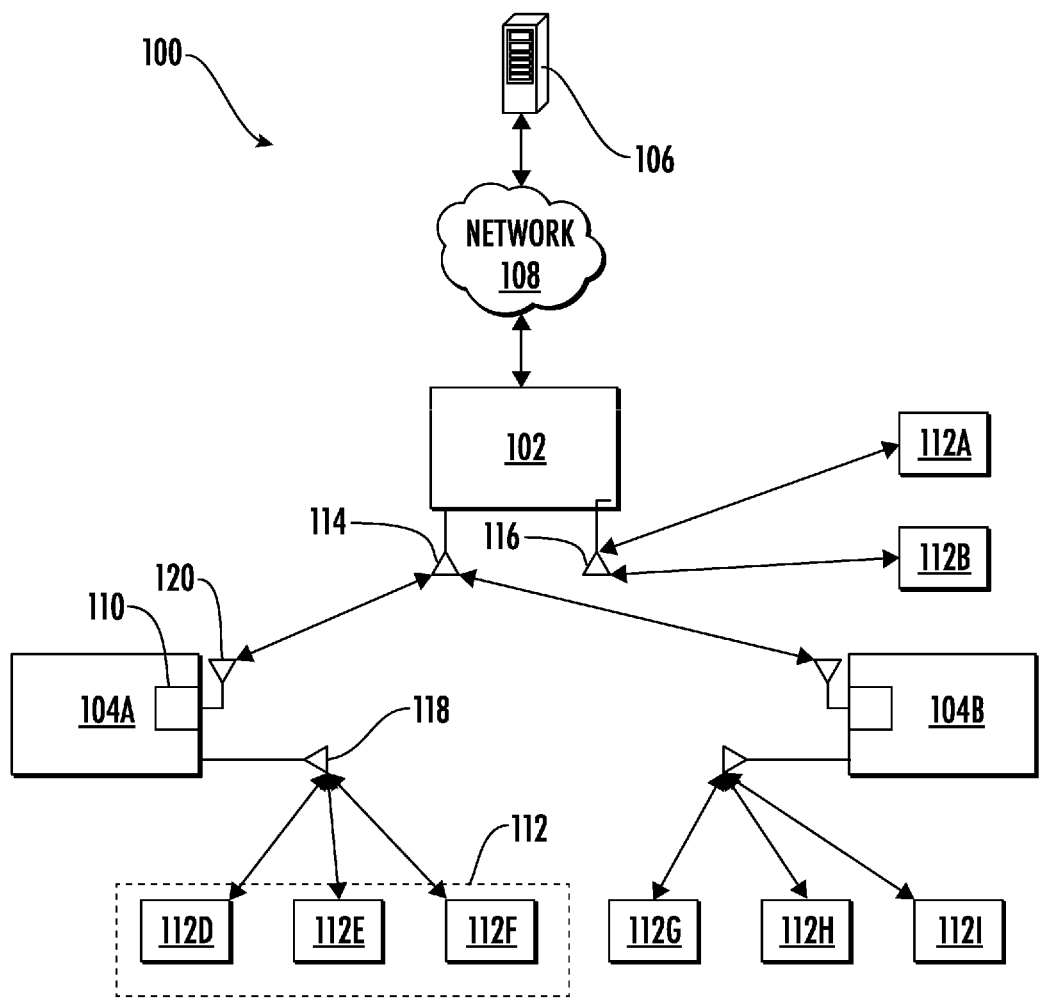
FIG. 1 illustrates a block diagram of a system environment, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The term "antenna element" is used herein to correspond to a device or apparatus (for example, an active element) that may be configured to generate radio frequency (RF) signals when a voltage signal is applied at the antenna element. For example, the antenna element may be configured to generate RF signal in high frequency (HF) band. Additionally, or alternatively, the antenna element may generate the RF signal in the ultra-high frequency (UHF) band. Additionally, or alternatively, the antenna element may generate the RF signal in other frequency band(s). In some examples, the antenna element may further comprise a matching circuit that, for example, is electronically coupled to the active element to generate the RF signals.

The term "radio frequency identification (RFID) tag" is used herein to correspond to an article, device, or apparatus that may an integrated circuit (IC), an antenna element, and/or a substrate. In an example embodiment, the antenna element and the IC may be fabricated on the substrate. In an example embodiment, the IC may be communicatively coupled to the antenna element through an interconnect on the substrate. In an example embodiment, the integrated circuit in the RFID tag may be configured to store encoded information or the encoded data. In some examples the RFID tag may be configured to operate in one or more RF frequency bands such as, but not limited to, 3 MHz-30 MHz (the HF band (for example, 13.56 MHz)) and/or 860 MHz-960 MHz (the UHF band). In some example embodiments, the RFID tag may have a dedicated power source that may enable the RFID tag to communicate with one or more components. Such RFID tags are referred to as active RFID tags. In alternative example embodiments, the RFID tag may not have a dedicated power source. Such RFID tags are referred to as passive RFID tags. In such embodiments, the RFID tag may have a power coupler that is capable of inducing electrical charge when the RFID tag is brought in an RF field. The induced electrical charge may thereafter be used to power the RFID tag itself.

A RFID system may include one or more RFID readers. The one or more RFID readers may be configured to read one or more RFID tags (placed on the one or more assets) either continuously or periodically. Further, the one or more RFID readers may be configured to transmit data, obtained from the one or more RFID tags, to a central server periodically. To facilitate the transmission of the data to the central server, the one or more RFID readers may be communicatively coupled to the central server through a backbone network such as, but not limited to, a wireless network, an Ethernet network, and/or the like. In some scenarios, for example during a power outage and/or disaster situations, RFID reader may not be able to communicate the data to the central server, as the backbone network may not be available.

Systems and methods described herein disclose an RFID system that may include a first RFID reader and one or more second RFID readers. In some examples, the first RFID reader may correspond to a master RFID reader that may comprise a communication module. In some examples, the communication module in the first RFID reader may be battery powered and may be capable of communicating with a central server. The communication module may utilize one or more communication protocols, such as, but not limited to, 2G, 3G, 4G, 5G, WiFi, WiMAX, ZigBee, Bluetooth, and/or the like to communicate with the central server.

In some examples, each of the one or more second RFID readers may correspond to a slave RFID reader that may comprise a first RFID tag and an RFID reader unit. The first RFID tag may comprise an antenna element and the RFID reader unit may comprise another antenna element. The second RFID reader may be configured to utilize the RFID reader unit to, periodically or continuously, interrogate one or more second RFID tags (installed on one or more assets). Further, the RFID reader unit may be configured to store data, received from the one or more second RFID tags (in response to the interrogation command) in a memory unit as the first data.

In some examples, the first RFID reader may be configured to, periodically or continuously, interrogate the first RFID tag in each of the one or more second RFID readers. Upon receiving the interrogation command, the first RFID tag may be configured to access the memory unit to retrieve the first data (received from the one or more second RFID tags), and/or may be configured to transmit the first data to the first RFID reader. Upon receiving the first data from the one or more second RFID readers, the first RFID reader may be configured to transmit the first data to the central server by utilizing the battery powered communication module.

In some examples, the first data may be shared between the first RFID reader and the one or more second RFID reader in accordance with one or more RFID communication protocols. As such, example systems and methods do not rely on the backbone network to communicate the first data between the first RFID reader and the one or more second RFID reader. In scenarios of a power outage, the first RFID reader may continue to operate on the battery power. Further, the first RFID reader may be able to interrogate the first RFID tag in each of the one or more second RFID readers during power outage, as the first RFID tag may be powered either through a battery in the first RFID tag (i.e., the first RFID tag is an active RFID tag) or through the RF signals transmitted by the first RFID reader (i.e., the first RFID tag is a passive tag). Accordingly, the loss of data during such scenarios may be avoided. Further, in environments where WiFi coverage lacking, the data from the RFID tags are transmitted through the RFID system. Examples of the disclosed embodiments may reduce overall cost of implementing the RFID system (for example, by reducing the reliance on backbone network).

FIG. 1 illustrates a block diagram of a system environment 100 according to one or more embodiments described herein. In an example embodiment, the system environment 100 may include a first RFID reader 102, one or more second RFID readers 104A and 104B (hereinafter referred to as second RFID readers 104), and a central server 106. The first RFID reader 102 may be communicatively coupled to the central server 106 through a network 108. In some examples, each of the second RFID readers 104 may include a first RFID tag (for example, a first RFID tag 110). In some examples, the system environment 100 may include one or more second RFID tags 112A, 112B, . . . , 112I (hereinafter referred to as second RFID tags 112). The second RFID tags 112 may be positioned on, for example but not limited to, one or more assets to be tracked as described above.

Figure 4:
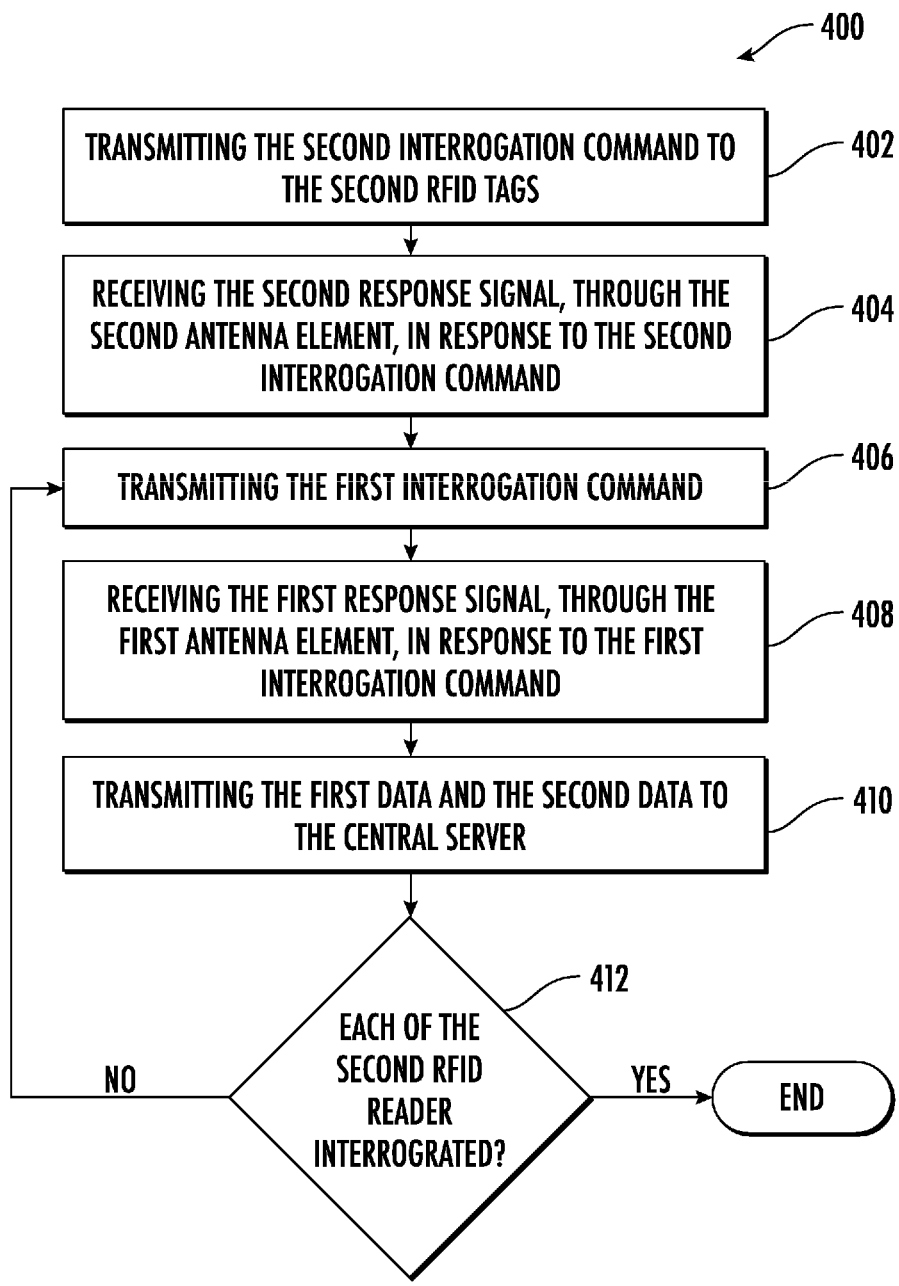
FIG. 4 illustrates a flowchart to operate the first RFID reader, according to one or more embodiments described herein.

In an example embodiment, the first RFID reader 102 may include suitable logic and/or circuitry that may enable the first RFID reader 102 to interrogate the second RFID tags 112, as well as the first RFID tag 110 in each of the second RFID readers 104, details of which are further described in FIG. 4. For example, the first RFID reader 102 may transmit a first interrogation command and a second interrogation command to the first RFID tag 110 and the second RFID tags 112, respectively. In some examples, the first RFID reader 102 may transmit the first interrogation command and/or the second interrogation command over the one or more frequency bands, such as but not limited to, the HF band and/or the UHF band. Additionally, or alternatively, the first RFID reader 102 may utilize one or more modulation techniques, such as but not limited to, Amplitude Shift keying (ASK) and Phase Jitter Modulation (PJM), to transmit the first interrogation command and/or the second interrogation command on the one or more frequency bands. The RF signal, over which the first interrogation command is transmitted to the first RFID tag 110, is hereinafter referred to as a first signal. The RF signal, over which the second interrogation command is transmitted to the second RFID tags 112, is hereinafter referred to as a second signal.

In response to the first interrogation command and the second interrogation command, the first RFID reader 102 may receive a first response signal and/or a second response signal from the first RFID tag 110 and/or the second RFID tags 112, respectively, details of which are further described in FIGS. 4 and 7-11. In an example embodiment, the first response signal and the second response signal may include first data and second data, respectively. Further, the first RFID reader 102 may be further configured to transmit the first data and the second data to the central server 106 over the network 108.

In an example embodiment, the first RFID reader 102 may comprise a first antenna element 114 that may be configured to facilitate transmission of the first interrogation command (through the first signal) and reception of the first data (through the first response signal) from the first RFID tag 110. In an example embodiment, the first antenna element 114 corresponds to an active element that may be configured to generate RF signals (e.g., the first signal) when a voltage signal is applied at the first antenna element 114. For example, the first antenna element 114 may be configured to generate the RF signal in HF band and/or UHF band. Some examples of the first antenna element 114 may include, but are not limited to, an omnidirectional antenna, a holographic antenna, a multiple input multiple output MIMO antenna, and/or the like. In some examples, the first antenna element 114 may be coupled to a matching circuit (not shown) that may enable the first antenna element 114 to generate the RF signal. Additionally or alternatively, the matching circuit may include one or more phase shifters (not shown) that may allow the first antenna element 114 to generate one or more beams in one or more directions (hereinafter referred to as beamforming). Such beamforming of the first signal may allow the first RFID reader 102 to direct the first signal to a particular location where a second RFID readers 104A of the second RFID readers 104 may be positioned.

Additionally or alternatively, the first RFID reader 102 may comprise a second antenna element 116 that may be configured to facilitate transmission of the second interrogation command (over the second signal) and reception of the second data (via the second response signal) from the second RFID tags 112. In some examples, the second antenna element 116 may be structurally similar to the first antenna element 114. In some examples, the embodiments applicable on the first antenna element 114 may also applicable on the second antenna element 116. Further, in some examples, the first antenna element 114 may be spaced apart from the second antenna element 116. In some examples, the second antenna element 116 may be configured to direct the second signal in a first predetermined direction. As such, the first RFID reader 102 may scan the second RFID tags 112 positioned or transiting through a location where second signal is being directed by the second antenna element 116. In various examples, the first antenna element 114 and the second antenna element 116 may have various configurations. For example, the first antenna element 114 and/or the second antenna element 116 may have 5 dbm and provide 35 dbm effective isotropic radiated power (EIRP).

In some examples, the scope of the disclosure is not limited to the first RFID reader 102 having two antenna elements (i.e., the first antenna element 114 and the second antenna element 116). In an example embodiment, the first RFID reader 102 may have only one antenna element that may be configured to transmit the first interrogation command and the second interrogation command. In such an embodiment, the first RFID reader 102 may be configured to separate the first interrogation command the second interrogation command by a predetermined time period and/or polarization. For example, the first RFID reader 102 may be configured to separate the transmission of the first interrogation command and the second interrogation command by utilizing Time Division Multiple Access (TDMA) technology (which enables the separation of the transmission by the predetermined time period). In another example, the first RFID reader 102 may be configured to separate the transmission of the first interrogation command and the second interrogation command by utilizing Orthogonal Frequency Division Multiple Access (OFDMA) technology. Similarly, the receptions of signals (e.g., the first response signal and the second response signal) by such antenna may be separated by the predetermined time period and/or polarization.

Figure 2:
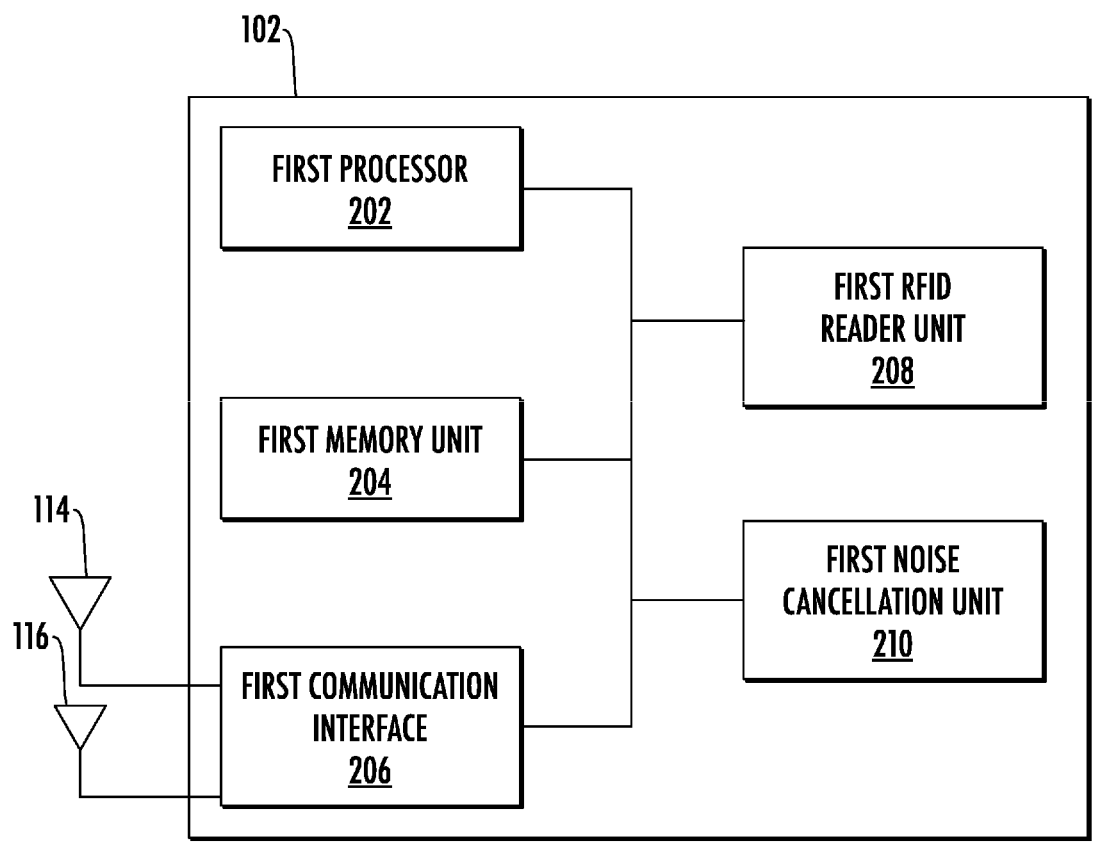
FIG. 2 illustrates a block diagram of the first RFID reader, according to one or more embodiments described herein.

The structure and operation of the first RFID reader 102 is further described in conjunction with FIG. 2.

Figure 7:
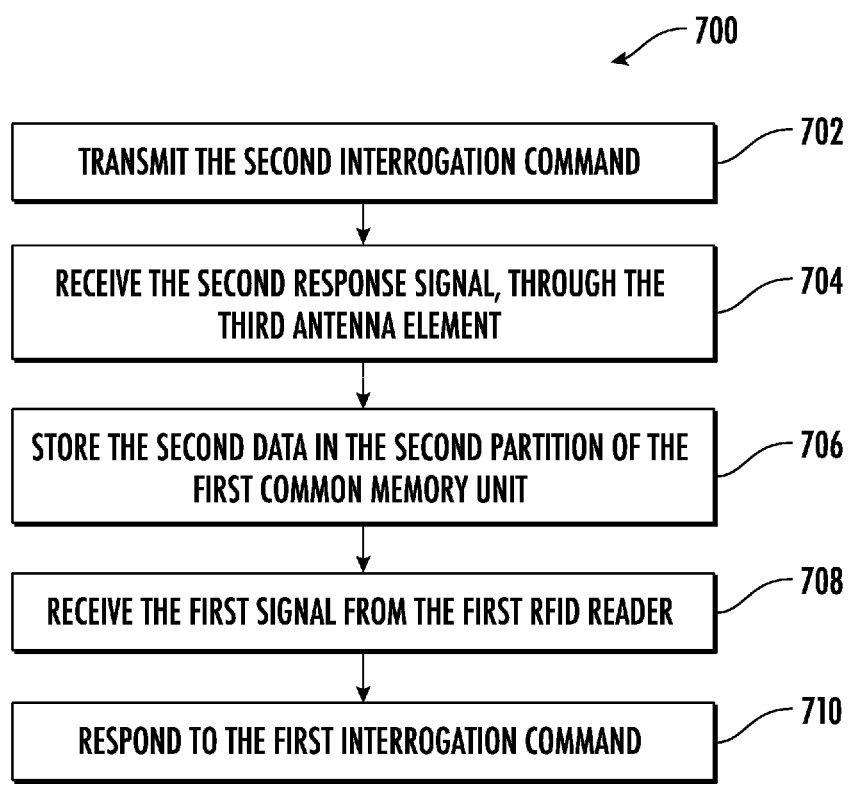
FIG. 7 illustrates a flowchart of a method for operating the second RFID reader, according to one or more embodiments described herein.

In an example embodiment, each of the second RFID readers 104 may include suitable logic and/or circuitry that may enable each of the second RFID readers 104 to interrogate the second RFID tags 112, as is further described in FIG. 7. In some examples, the structure of each of the second RFID readers 104 may be similar to the first RFID reader 102. For example, each of the second RFID readers 104 includes a third antenna element 118 that may be configured to generate the second signal. Further, the second RFID readers 104 may be configured to utilize the third antenna element 118 to transmit the second interrogation command to the second RFID tags 112 over the second signal, as is further described in FIG. 7. Furthermore, the second RFID readers 104 may utilize the third antenna element 118 to receive the second response signal (that includes the second data) from the second RFID tags 112, as is further described in FIG. 7. In some examples, the third antenna element 118 may have a similar structure to that of the second antenna element 116. In some examples, the embodiments applicable on the second antenna element 116 may also be applicable on the third antenna element 118. In some examples, the third antenna element 118 may be configured to direct the second signal in a second predetermined direction. As such, the second RFID readers 104 may scan the second RFID tags 112 positioned or transiting through a location where the second signal is being directed by the third antenna element 118.

Additionally or alternatively, each of the second RFID readers 104 may include the first RFID tag 110. In an example embodiment, the first RFID tag 110 may include a suitable logic and/or circuitry that may enable the first RFID tag 110 to receive the first interrogation command, as is further described in conjunction with FIG. 7. In response to the first interrogation command, the first RFID tag 110 may be configured to transmit the first data to the first RFID reader 102, as is further described in FIG. 7. In an example embodiment, the first RFID tag 110 may include an integrated circuit (IC), a fourth antenna element 120, and a substrate. In an example embodiment, the fourth antenna element 120 and the IC are fabricated on the substrate. In an example embodiment, the fourth antenna element 120 may have a similar structure to that of the first antenna element 114. Further, the embodiments applicable on the first antenna element 114 are also applicable of the fourth antenna element 120. In some examples, the IC is communicatively coupled to the fourth antenna element 120 through an interconnect on the substrate. Additionally or alternatively, the first RFID tag 110 may be associated with a unique identifier (ID) that may be stored in the IC. In some examples, the unique ID of an RFID tag may correspond to an ID that may be utilized to differentiate the first RFID tag 110 from the other first RFID tags 110 in the system environment, and further to differentiate the second RFID readers from one another. For example, the unique ID for the first RFID tag 110 in the second RFID reader 104A may be different from the unique ID of the first RFID tag 110 in the second RFID reader 104B. Some examples of the unique ID may include a medium access control (MAC) Address, and/or the like. In some examples, the first RFID tag 110 may be configured to operate in various RF frequency bands such as, but not limited to, 3 MHz-30 MHz (the HF band (for example 13.56 MHz)) and/or 860 MHz-960 MHz (UHF band). In some example embodiments, the first RFID tag 110 may have a dedicated power source that may enable the first RFID tag 110 to communicate with one or more components of the system environment 100. In alternative example embodiments, the first RFID tag 110 may not have the dedicated power source. In such embodiments, the first RFID tag 110 may have a power coupler that is capable of inducing electrical charge when the first RFID tag 110 is brought in an RF field. The induced electrical charge is thereafter used to power the first RFID tag 110 itself. For example, the first RFID tag 110 may induce power when the first RFID tag 110 receives the first signal from the first RFID reader 102. The structure of the first RFID tag 110 and the second RFID readers 104 are further described in conjunction with FIG. 6. In various examples, the second RFID readers 104 may have various configurations. For example, the second RFID readers 104 may have 30 dbm output power and provide 25 dbm EIRP.

In an example embodiment, the second RFID readers 104 may be installed in one or more zones of the system environment 100. For example, the second RFID reader 104A may be installed in Zone-1 of the system environment 100 and the second RFID reader 104B may be installed in the Zone-2 in the of the system environment 100. In an example embodiment, the second RFID reader 104A may be configured to interrogate the second RFID tags 110 in Zone-1 in the system environment 100. Similarly, the second RFID reader 104B may be configured to interrogate the second RFID tags 110 in Zone-2 in the system environment 100.

In an example embodiment, the central server 106 may include suitable logic and/or circuitry that may enable the central server 106 to receive the first data and the second data from the first RFID reader 102 via, for example but not limited to, the network 108. In some examples, the central server 106 may utilize the first data and the second data to track the one or more assets in the system environment 100. Additionally or alternatively, the central server 106 may utilize the first data and the second data to monitor the availability of the one or more assets in the system environment 100. In an example embodiment, the central server 106 may correspond to a computing device such as, but not limited to, a laptop, a server, or portable computing device.

In an example embodiment, the second RFID tags 112 may be similar to the first RFID tag 110. In some examples, the embodiments applicable on the first RFID tag 110 may also be applicable on the second RFID tags 112.

The network 108 corresponds to a medium through which content and messages may flow between various devices in the system environment 100 (e.g., the first RFID reader 102 and central server 106). Examples of the network 108 may include wired and/or wireless networks, such as but not limited to, a Wireless Fidelity (Wi-Fi) network, a Wireless Area Network (WAN), a Local Area Network (LAN), and/or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, 4G, or 5G communication protocols.

FIG. 2 illustrates a block diagram of the first RFID reader 102, according to one or more embodiments described herein. In an example embodiment, the first RFID reader 102 may comprise a first processor 202, a first memory unit 204, a first communication interface 206, a first RFID reader unit 208, the first antenna element 114, the second antenna element 116, and a first noise cancellation circuit 210.

The first processor 202 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 2 as a single processor, in an embodiment, the first processor 202 may include a plurality of processors and signal processing modules. The plurality of processors may be embodied on a single electronic device or may be distributed across a plurality of electronic devices collectively configured to function as the circuitry of the first RFID reader 102. The plurality of processors may be in operative communication with each other and may be collectively configured to perform one or more functionalities of the circuitry of the first RFID reader 102 as described herein. In an example embodiment, the first processor 202 may be configured to execute instructions stored in the first memory unit 204 or otherwise accessible to the first processor 202. These instructions, when executed by the first processor 202, may cause the circuitry of the first RFID reader 102 to perform one or more of the functionalities, as described herein.

Whether configured by hardware, firmware/software methods, or by a combination thereof, the first processor 202 may include an entity capable of performing operations according to embodiments of the present disclosure while configured accordingly. Thus, for example, when the first processor 202 is embodied as an ASIC, FPGA or the like, the first processor 202 may include specifically configured hardware for conducting one or more operations described herein. Additionally, or alternatively, when the first processor 202 is embodied as an executor of instructions, such as may be stored in the first memory unit 204, the instructions may specifically configure the first processor 202 to perform one or more algorithms and operations described herein.

Thus, the first processor 202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory unit 204 may include suitable logic, circuitry, and/or interfaces that are adapted to store a set of instructions that is executable by the first processor 202 to perform predetermined operations. Additionally or alternately, the first memory unit 204 may be configured to store the first data (obtained from the first RFID tag 110) and the second data (obtained from the second RFID tags 112). Further, the first memory unit 204 may be configured to store a list of the second RFID readers 104 along with the respective unique ID, as is further illustrated in FIG. 4. Additionally or alternatively, the first memory unit 204 may be configured to store zone ID associated with the second RFID reader 104, as is further described in FIG. 4. In an example embodiment, zone ID may be representative of zone in which a second RFID reader (e.g., 104A) is installed. In some examples, the unique ID may be associated with the respective first RFID tag 110 in the second RFID readers 104. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the first memory unit 204 may be integrated with the first processor 202 on a single chip, without departing from the scope of the disclosure.

The first communication interface 206 may include suitable logic and/or circuitry that may enable the first communication interface 206 to facilitate transmission and reception of messages and data to and from various devices. For example, the first communication interface 206 may be communicatively coupled with the central server 106. Examples of the first communication interface 206 may include, but are not limited to, an antenna, an Ethernet port, a USB port, a serial port, or any other port that can be adapted to receive and transmit data. The first communication interface 206 may transmit and receive data and/or messages in accordance with the various communication protocols, such as, but not limited to, EPC global, DOD, I2C, TCP/IP, UDP, and 2G, 3G, 4G or 5G communication protocols.

In some examples, the first communication interface 206 may facilitate the communication with the first RFID tag 110 and the second RFID tags 112. In some examples, the first communication interface 206 may be communicatively coupled with the first antenna element 114 and the second antenna element 116. The first antenna element 114 may be positioned to be spatially apart from the second antenna element 116. Such positioning of the first antenna element 114 and the second antenna element 116 (spatially apart from each other) may reduce the interference between the signals transmitted/received via the first antenna element 114 and the second antenna element 116. For example, the first antenna element 114 and the second antenna element 116 spatially provide 40 dB isolation. In some examples, the first communication interface 206 may be configured to transmit/receive data through the first antenna element 114 and the second antenna element 116 by utilizing one or more of EPC global communication standards or DOD communication standards.

The first RFID reader unit 208 may include suitable logic and/or circuitry for reading the first data and the second data from the first RFID tag 110 and the second RFID tags 112, respectively, as is further described in FIG. 4. To read the first data and the second data from the first RFID tag 110 and the second RFID tags 112, the first RFID reader unit 208 may cause the first antenna element 114 and the second antenna element 116 to transmit the first interrogation command and the second interrogation command, respectively, as is further described in FIG. 4. Further, prior to transmitting the first interrogation command the second interrogation command, the first RFID reader unit 208 may cause the first communication interface 206 to modulate the first interrogation command and the second interrogation command, over the first signal and the second signal, using the one or more modulation techniques (such as ASK and PJM). In response to the first interrogation command and the second interrogation command, the first RFID reader unit 208 may receive the first data and the second data from the first RFID tag 110 and the second RFID tags 112, respectively, as is further described in FIG. 4.

In some examples, the first RFID reader unit 208 may include one or more of filters, analog to digital (A/D) converters, Digital to Analog (D/A) convertors, matching circuits, amplifiers, and/or tuners that may enable the first RFID reader unit 208 to transmit data (e.g., the first interrogation command and the second interrogation command) and receive data (e.g., the first data and the second data) over the one or more frequency bands through the first antenna element 114 and the second antenna element 116. The first RFID reader unit 208 may be implemented using one or more of Application Specific Integrated Circuit (ASIC) and Field Programmable Gate Array (FPGA).

The first noise cancellation circuit 210 may include suitable logic and/or circuitry that may reduce the interference amongst the signals (e.g., the first signal, the second signal, the first response signal and the second response signal) transmitted/received by the first antenna element 114 and the second antenna element 116. In some examples, the first noise cancellation circuit 210 may include one or more filters, one or more phase shifters and/or the like. The structure and operation of the first noise cancellation circuit 210 is further described in conjunction with FIG. 3. The operation of the first RFID reader 102 is further described in conjunction with FIG. 4.

Figure 3:
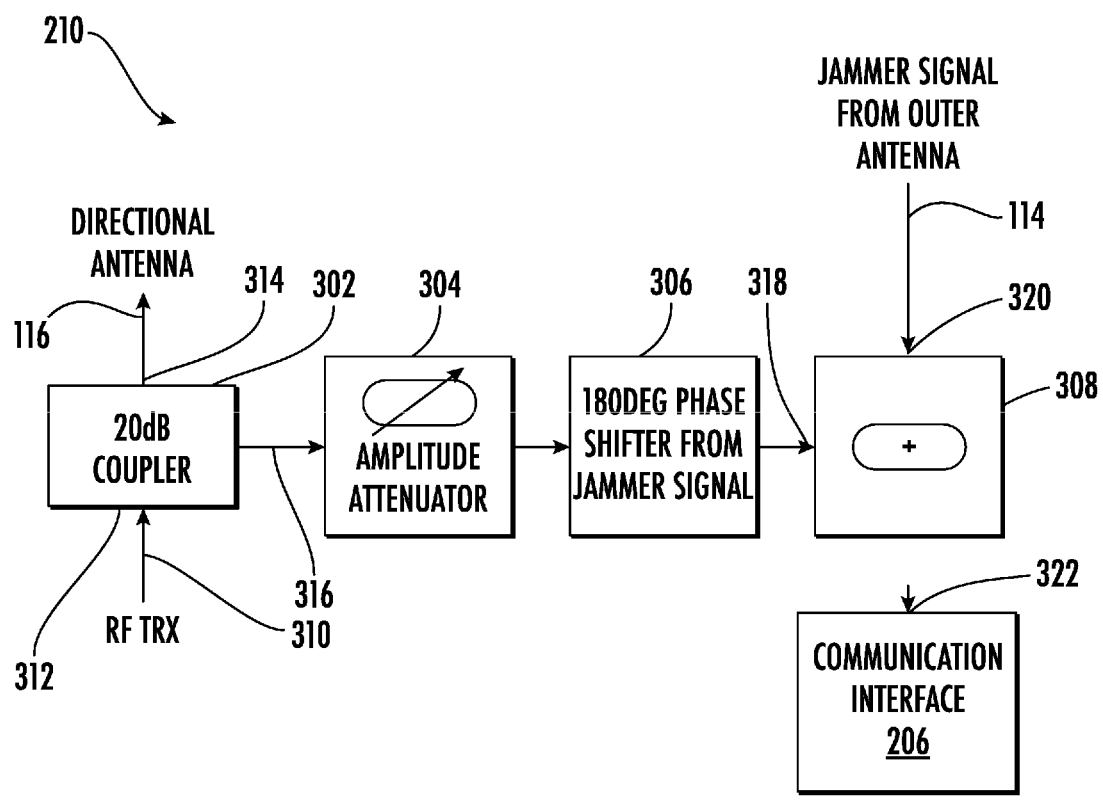
FIG. 3 illustrates a block diagram of a first noise cancellation circuit, according to one or more embodiments described herein.

FIG. 3 illustrates a block diagram of the first noise cancellation circuit 210, according to one or more embodiments described herein.

The first noise cancellation circuit 210 includes a coupler 302, an amplitude attenuator 304, a phase shifter 306, and a combiner 308. In an example embodiment, the coupler 302 may be communicatively coupled to an input channel 310 and the second antenna element 116. The coupler 302 may be communicatively coupled to the amplitude attenuator 304. The amplitude attenuator 304 may be further coupled to the phase shifter 306, and the phase shifter 306 may be further coupled to the combiner 308. The combiner 308 may be communicatively coupled to the first antenna element 114 and the first communication interface 206.

The coupler 302 may include suitable logic and/or circuitry that may enable the coupler 302 to retrieve a portion of the second signal (that may include the second interrogation command) to be transmitted via the second antenna element 116. In an example embodiment, the coupler 302 may correspond to a three terminal microwave device that may include a first terminal 312, a second terminal 314, and a third terminal 316. In some examples, the first terminal 312 may be coupled to the input channel 310, the second terminal 314 may be coupled to the second antenna element 116, and the third terminal 316 may be coupled to the amplitude attenuator 304. In an example embodiment, the input channel 310 may correspond to a signal path that may couple the first communication interface 206 with the coupler 302. The input channel 310 may correspond to a conduit/waveguide through which the first communication interface 206 may transmit the first signal to the coupler 302. In an example embodiment, the coupler 302 may be configured to transmit the portion of the second signal to the amplitude attenuator 304 through the third terminal 316. Some examples of the coupler 302 may include, but not limited to, a forward-wave coupler, a backward-wave coupler, a hybrid coupler, and/or the like.

The amplitude attenuator 304 may include suitable logic and/or circuitry to attenuate the amplitude of the portion of the second signal received from the coupler 302 to generate an attenuated portion of the second signal. In some examples, the amplitude attenuator 304 may include one or more resistors arranged in one or more configurations, such as pi-pad configuration and T-pad configuration. The one or more resistors may facilitate the attenuation of the portion of the second signal. Some examples of the amplitude attenuator 304 may include, but are not limited to, an active attenuator, a passive attenuator, it-type unbalanced attenuator circuit, it-type balanced attenuator circuit, T-type unbalanced attenuator circuit, and/or T-type balanced attenuator circuit.

The phase shifter 306 may include suitable logic and/or circuitry to shift phase of the attenuated portion of the second signal by a predetermined amount to generate a phase shifted portion of the second signal. For example, the phase shifter 306 may shift the phase of the attenuated portion of the second signal by, for example but not limited to, 180 degrees. In some examples, the phase shifter 306 may be configured to add a propagation delay to the attenuated portion of the second signal in order to shift the phase of the attenuated the portion of the second signal. Some examples of the phase shifter 306 may include, but not limited to, micro-electromechanical system (MEMS) phase shifter, an analog phase shifter, a digital phase shifter, an active phase shifter, a passive phase shifter, and/or the like.

The combiner 308 may include suitable logic and/or circuitry that may enable the combiner 308 to combine one or more signals. In an example embodiment, the combiner 308 may be a three terminal microwave device that may include a fourth terminal 318, a fifth terminal 320, and a sixth terminal 322. The fourth terminal 318 may be communicatively coupled to the phase shifter 306 and may be configured to receive the phase shifted portion of the second signal. Further, the fifth terminal 320 may be coupled to the first antenna element 114, and the sixth terminal 322 may be coupled to the first communication interface 206. The combiner 308 may be configured to combine the phase shifted portion of the second signal and the first response signal received from the first antenna element 114 to generate a noise free first response signal.

In operation, the coupler 302 may be configured to retrieve the portion of the second signal from the second signal (that includes the second interrogation command) to be transmitted via the second antenna element 116. The coupler 302 may be configured to transmit the portion of the second signal to the amplitude attenuator 304. The amplitude attenuator 304 may be configured to attenuate the amplitude of the portion of the second signal to generate the attenuated portion of the second signal. In an example embodiment, the amplitude attenuator 304 may be configured to transmit the attenuated portion of the second signal to the phase shifter 306.

In some examples, the phase shifter 306 may be configured to shift the phase of the attenuated portion of the second signal by the predetermined amount. For example, the phase shifter 306 may be configured to phase shift the attenuated portion of the second signal by 180 degrees to generate phase shifted portion of the second signal. Thereafter, phase shifter 306 may be configured to transmit the phase shifted portion of the second signal to the combiner 308. In an example embodiment, the combiner 308 may be configured to combine the phase shifted portion of the second signal with the first response signal (received from the first RFID tag 110).

In some examples, the first response signal received by the first antenna element 114 may comprise noise because of the interference caused by the transmission of the second signal from the second antenna element 116. For example, the first response signal may include the portion of the second signal (as noise). As discussed above, the phase shifted portion of the second signal may be 180 degrees out of phase, and the first response signal (received via the first antenna element 114) includes the portion of the second signal. Therefore, when the combiner 308 adds the first response signal with the phase shifted portion of the second signal, the phase shifted portion of the second signal may cancel out with the portion of the second signal present in the first response signal. Accordingly, the combiner 308 may generate the noise free first response signal.

In some examples, the scope of the disclosure is not limited to having one first noise cancellation circuit 210 in the first RFID reader 102. In an example embodiment, the first RFID reader 102 may include multiple noise cancellation circuits. For instance, the first RFID reader 102 may include another noise cancellation circuit for the second antenna element 116. The other noise cancellation circuit may be configured to generate a noise free second response signal (received from the second RFID tags 112) based on the portion of the first signal (containing the first interrogation command) retrieved from the first signal transmitted via the first antenna element 114.

FIG. 4 illustrates a flowchart 400 to operate the first RFID reader 102, according to one or more embodiments described herein.

At step 402, the first RFID reader 102 may include means, such as the first processor 202, the first communication interface 206, the first RFID reader unit 208, the second antenna element 116, and/or the like for transmitting the second signal in the first predetermined direction. As discussed, the second signal may include the second interrogation command. Accordingly, as and when the second RFID tags 112 passes through the location where the first RFID reader 102 directs the second signal, the second RFID tags 112 may receive the second interrogation command.

As discussed above, in some examples, the second RFID tags 112 may correspond to passive RFID tags. Accordingly, when the second RFID tags 112 receives the second signal, the second signal may cause the second RFID tags 112 to induce charge. The induced charge may be used by the second RFID tags 112 to power itself (also referred to as power harvesting). Thereafter, the second RFID tags 112 may utilize the induced charge to transmit the second response signal. In some examples, where the second RFID tags 112 may correspond to active RFID tags, the first RFID reader unit 208 may directly transmit the second interrogation command over the second signal. Upon receiving the second interrogation command, the second RFID tags 112 may utilize the power stored in the battery (in the second RFID tag) to transmit the second response signal.

In some examples, the first RFID reader unit 208 may be configured to utilize standards such as, but not limited to, EPC global standards to transmit the second interrogation command. For example, the second interrogation command may include "Read" command. Such interrogation command (comprising the "Read" command), when received by an RFID tag, may cause the RFID tag to retrieve and transmit data stored in the RFID tag. For example, upon receiving such interrogation command (comprising the "Read" command), the second RFID tags 112 may retrieve and transmit the second data stored in the second RFID tags 112.

In some examples, the first RFID reader unit 208 may be configured to cause the second antenna element 116 to transmit the second interrogation command (over the second signal) continuously. In another embodiment, the first RFID reader unit 208 may be configured to cause the second antenna element 116 to the transmit the second interrogation command (over the second signal) periodically after a predetermined time period. For example, the first RFID reader unit 208 may be configured to cause the second antenna element 116 to transmit the second interrogation command after every 200 ms.

At step 404, the first RFID reader 102 may include means such as the first processor 202, the first communication interface 206, the first RFID reader unit 208, the second antenna element 116, and/or the like for receiving the second response signal (through the second antenna element 116), in response to the second interrogation command (transmitted over the second signal). In an example embodiment, the first RFID reader unit 208 may be configured to receive the second response signal from the second RFID tags 112, in accordance with the EPC global and/or DOD standards. In some examples, the second response signal may include the second data. In some examples, the second data may correspond to the data stored in the second RFID tags 112. Further, the first RFID reader unit 208 may be configured to store the second data in the first memory unit 204.

At step 406, the first RFID reader 102 may include means such as the first processor 202, the first communication interface 206, the first RFID reader unit 208, first antenna element 114, and/or the like for transmitting the first interrogation command. In an example embodiment, the first RFID reader unit 208 may cause the first antenna element 114 to transmit the first interrogation command over the first signal. In an example embodiment, the first RFID reader unit 208 may utilize EPC global and the DOD standards to transmit the first interrogation command over the first signal.

In an example embodiment, prior to transmitting the first interrogation command, the first RFID reader unit 208 may be configured to select a second RFID reader (e.g., second RFID reader 104A) of the second RFID readers 104. In some examples, the first RFID reader unit 208 may sequentially select the second RFID reader 104A from the list of the second RFID readers 104 stored in the first memory unit 204. The following table illustrates an example list of the second RFID readers 104 stored on the first memory unit 204:

TABLE 1

List of the second RFID readers 104

| List of Second RFID readers 104 | Unique ID | Zone ID | Location |
|---|---|---|---|
| Second RFID reader 104A | 1234567890 | Z1 | x: 5, y: 6, z: 10 |
| Second RFID reader 104B | 0987654321 | Z2 | X: 7, y: 10, z: 25 |

Referring to Table 1, it can be observed that the list of the second RFID readers 104 may include the unique ID associated with respective first RFID tag 110 associated with the second RFID readers 104. Further, Table 1 depicts a location at which the second RFID readers 104 are positioned with respect to the first RFID reader 102. For example, the second RFID reader 104A is located at coordinates (5, 6, 10), while the second RFID reader 104B is located at coordinates (7, 10, 25), with respect to the first RFID reader 102. In some examples, the Table 1 further illustrates zone ID, where the second RFID reader 104 are installed.

In some examples, the first RFID reader unit 208 may sequentially select the second RFID reader 104A from the list of the second RFID readers (e.g., table 1). Additionally, the first RFID reader unit 208 may be configured to retrieve the unique ID associated with first RFID tag 110 in the selected second RFID reader 104A and the location of the selected second RFID reader 104A. Thereafter, the first RFID reader unit 208 may be configured to include the unique ID in the first interrogation command. Further, the first RFID reader unit 208 may cause the first antenna element 114 to direct the first signal in a direction of the retrieved location. Subsequently, the first RFID reader unit 208 transmits the first interrogation command.

In some examples, the scope of the disclosure is not limited to the transmitting the first interrogation signals only based on the coordinates of the second RFID readers 104. In an example embodiment, the first RFID reader may transmit the first interrogation signal based zone in which the second RFID readers 104 are installed. For example, based on the zone in which the second RFID reader (e.g., 104A) is installed, the first RFID reader unit 208 may be configured to retrieve the coordinates at which the second RFID reader 104A is installed. Subsequently, the first RFID reader unit 208 transmits the first interrogation command.

In some examples, the scope of the disclosure is not limited to the first interrogation command only including the unique ID of the first RFID tag 110 included in the second RFID reader 104A. In an example embodiment, the first RFID reader unit 208 may further include an address of a memory unit in the second RFID reader 104 where the first RFID reader 102 intends to read the first data. The following table illustrates an example first interrogation command:

TABLE 2

An example first interrogation command

| Command | Unique ID | Address |
|---------|-----------|---------|
| Read    | 1234567890 | 34AD   |

Accordingly, in an example embodiment, the first interrogation command may be different from the second interrogation command (transmitted at the step 402). For example, in addition to the "Read" command, the first interrogation command may include the unique ID associated with the first RFID tag 110 (included in the selected second RFID reader 104A) that is to be interrogated, and/or the address of the memory unit from where the first RFID reader 102 intends to read the first data.

Figure 5:
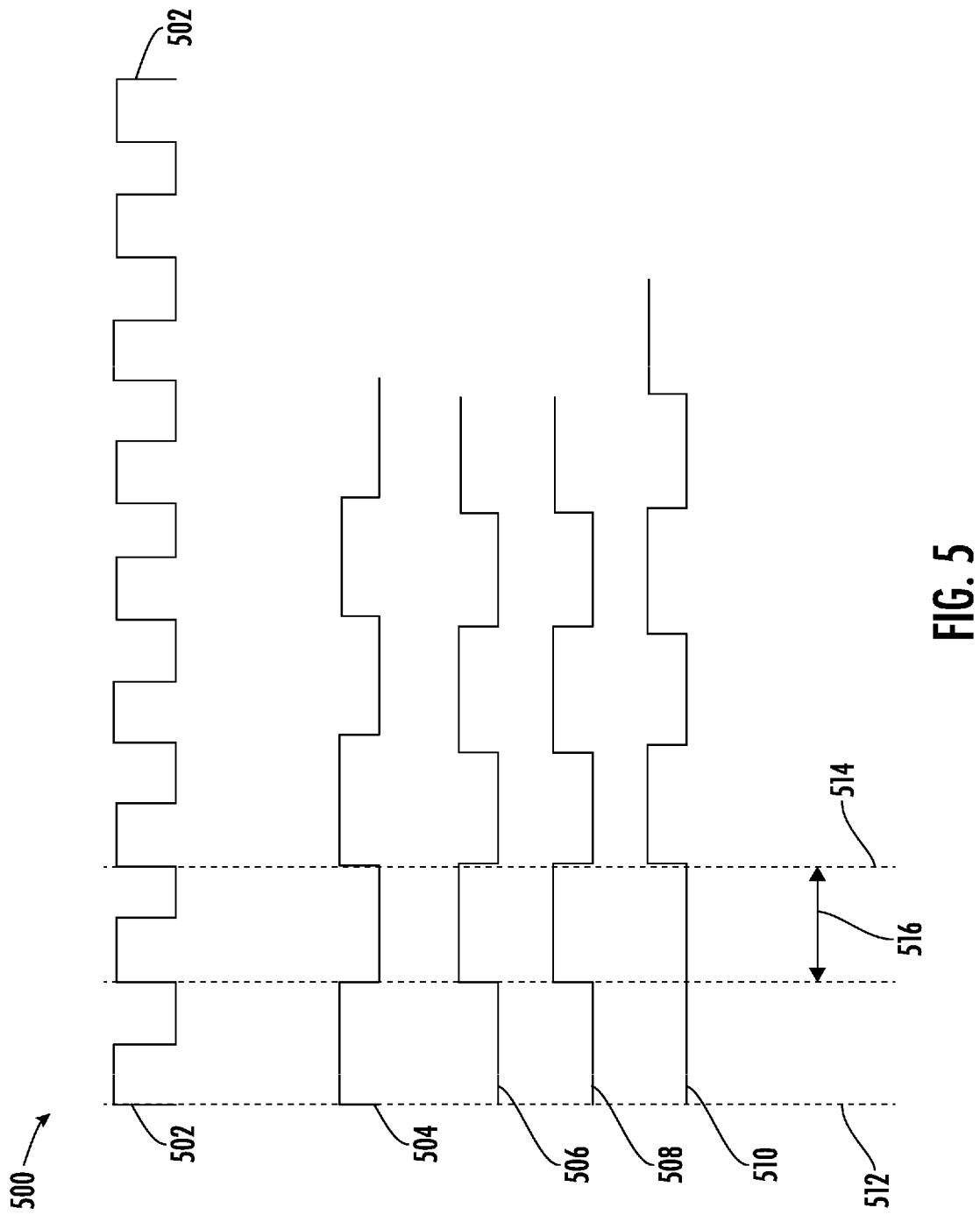
FIG. 5 illustrates an example timing diagram of transmission of a first interrogation command and a second interrogation command, according to one or more embodiments described herein.

In some examples, the first RFID reader unit 208 may be configured to cause the first antenna element 114 and the second antenna element 116 to transmit the first interrogation command simultaneously with the second interrogation command, respectively. For example, step 402 may be performed simultaneously with step 406. In another embodiment, the first RFID reader unit 208 may cause the first antenna element 114 to transmit the first interrogation command subsequent to the second interrogation command. More particularly, the first RFID reader unit 208 may cause the first antenna element 114 to transmit the first interrogation command during the predetermined time period (i.e., the time period between the two subsequent transmission of the second interrogation command). Accordingly, the first RFID reader unit 208 may cause alternating transmission of the first interrogation command and the second interrogation command. FIG. 5 illustrates a timing diagram depicting an example transmission of the first interrogation command the second interrogation command. In another embodiment, the first RFID reader unit 208 may cause the first antenna element 114 to transmit the first interrogation command prior to the second interrogation command. For example, step 406 (and step 408) may be performed prior to step 402 (and step 404).

At step 408, the first RFID reader 102 may include means such as the first processor 202, the first communication interface 206, the first RFID reader unit 208, the first antenna element 114, and/or the like for receiving the first response signal, through the first antenna element 114, in response to the first interrogation command (transmitted over the first signal). Because the first interrogation command includes the unique ID of the first RFID tag 110 in the second RFID readers 104, the first RFID reader unit 208 may receive the first response signal from the first RFID tag 110 that is associated with the unique ID. For example, the first RFID reader unit 208 may receive response for the first RFID tag 110 in the second RFID reader 104A. In some examples, the first response signal may include the first data.

At step 410, the first RFID reader 102 may include means such as the first processor 202, the first communication interface 206, and/or the like for transmitting the first data and the second data to the central server 106. In some examples, the first processor 202 may transmit the first data and the second data after the first RFID reader unit 208 has interrogated the first RFID tag 110 in each of the second RFID readers 104. In another embodiment, the first processor 202 may transmit the first data and the second data as and when the first RFID reader unit 208 receives the first data from the first RFID tag 110 in a second RFID reader of the second RFID readers 104 (e.g., the first data from the first RFID tag 110 in the second RFID readers 104A).

At step 412, the first RFID reader 102 may include means such as the first processor 202, the first communication interface 206, the first RFID reader unit 208, and/or the like for determining whether the first RFID reader unit 208 has transmitted the first interrogation signal to each of the second RFID readers 104. If the first RFID reader unit 208 determines that the first interrogation command has been transmitted to each of the second RFID readers 104, the first RFID reader unit 208 may be configured to end the execution of the flowchart 400. However, if the first RFID reader unit 208 determines that the first interrogation command has not been transmitted to each of the second RFID readers 104, the first RFID reader unit 208 may be configured to repeat the step 406.

FIG. 5 illustrates an example timing diagram 500 of transmission of the first interrogation command and the second interrogation command, according to one or more embodiments described herein.

The example timing diagram 500 includes a master clock cycle 502, a first timing signal 504 depicting transmission of the first interrogation command, a second timing signal 506 depicting transmission of the second interrogation command, a third timing signal 508 depicting reception of the second response signal, and a fourth timing signal 510 depicting reception of the first response signal.

It can be observed from the example timing diagram 500 that the first RFID reader unit 208 may cause the transmission of the second interrogation command after the predetermined time period (depicted by 516). For example, the completion of transmission of the second interrogation command 512 and the start of the transmission of the second interrogation command 514 are separated by the predetermined time period 516. Further, as depicted from FIG. 5, the first RFID reader unit 208 may cause the transmission of the first interrogation command (depicted by the second timing signal 506) during the predetermined time period 516. Accordingly, the first RFID reader unit 208 may cause alternating transmission of the first interrogation command and the second interrogation command. Additionally or alternatively, during the predetermined time period (depicted by 516), the first RFID reader unit 208 may receive the second response signal (as depicted by third timing signal 508). Further, in response to the first interrogation command, the first RFID reader unit 208 may receive the first response signal (depicted by the fourth timing signal 510).

Because the reception of the second response signal may overlap with the transmission of the first interrogation command (transmitted over the first signal), the second response signal may interfere with the first signal. Accordingly, the first noise cancellation circuit 210 may remove the noise from the second response signal. Similarly, because the reception of the first response signal may overlap with the transmission of the second interrogation command (transmitted over the second signal), the first response signal may interfere with the second signal. Accordingly, the first noise cancellation circuit 210 may remove the noise from the second response signal.

Figure 6:
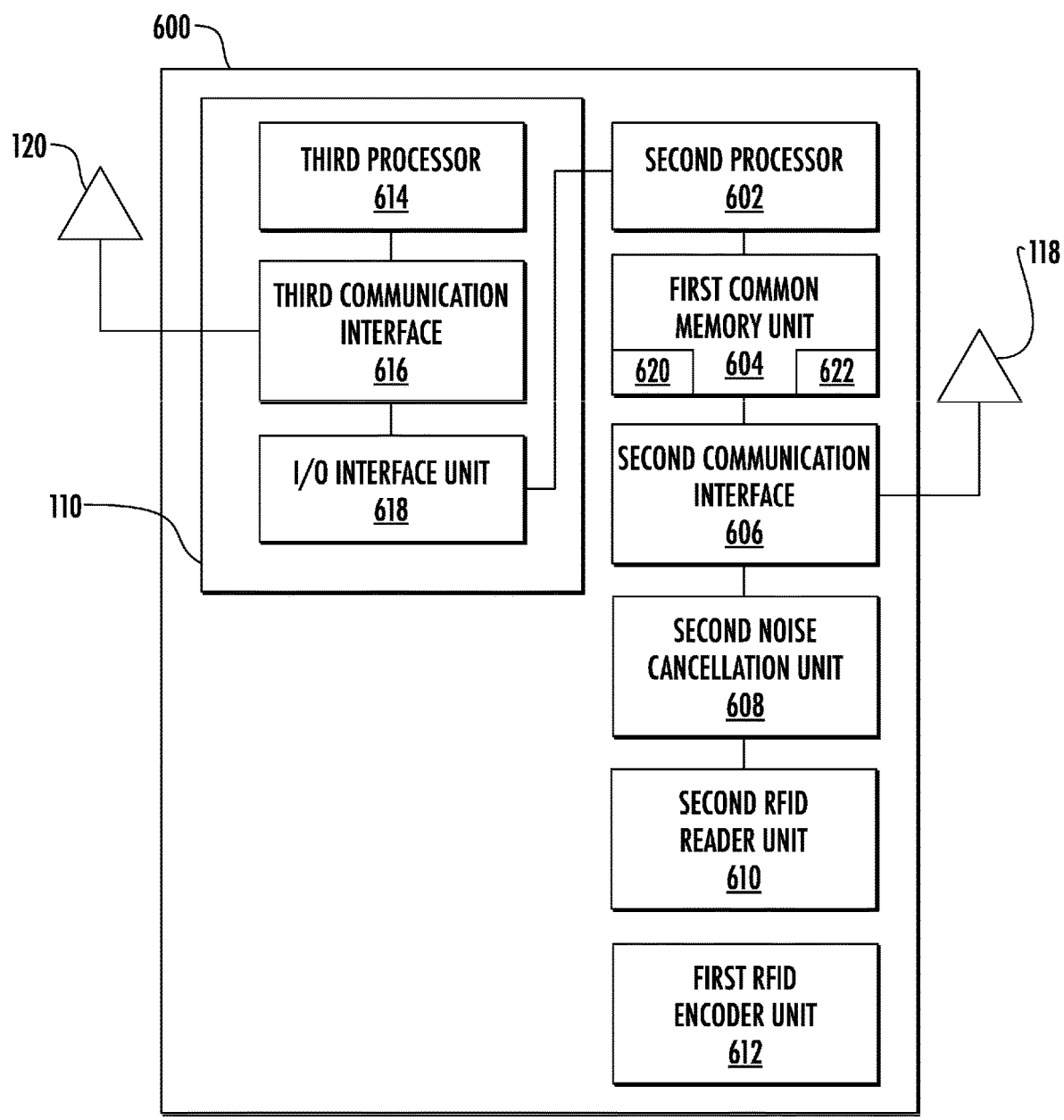
FIG. 6 illustrates a block diagram of a second RFID reader, according to one or more embodiments described herein.

FIG. 6 illustrates a block diagram 600 of an example second RFID reader 104A, according to one or more embodiments described herein.

The second RFID reader 104A may include the first RFID tag 110, the second processor 602, a first common memory unit 604, a second communication interface 606, a second noise cancellation circuit 608, a second RFID reader unit 610, and a first RFID encoder unit 612. In some examples, the second communication interface 606 may further be coupled to the third antenna element 118. In an example embodiment, the first RFID tag 110 may further include a third processor 614, a third communication interface 616, and an Input/Output (I/O) interface unit 618. The third communication interface 616 may be further coupled to the fourth antenna element 120.

The second processor 602 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 6 as a single processor, in an embodiment, the second processor 602 may include a plurality of processors and signal processing modules. The plurality of processors may be embodied on a single electronic device or may be distributed across a plurality of electronic devices collectively configured to function as the circuitry of the second RFID reader 104A. The plurality of processors may be in operative communication with each other and may be collectively configured to perform one or more functionalities of the circuitry of the second RFID reader 104A, as described herein. In an example embodiment, the second processor 602 may be configured to execute instructions stored in the first common memory unit 604 or otherwise accessible to the second processor 602. These instructions, when executed by the second processor 602, may cause the circuitry of the second RFID reader 104A to perform one or more of the functionalities, as described herein.

Whether configured by hardware, firmware/software methods, or by a combination thereof, the second processor 602 may include an entity capable of performing operations according to embodiments of the present disclosure while configured accordingly. Thus, for example, when the second processor 602 is embodied as an ASIC, FPGA or the like, the second processor 602 may include specifically configured hardware for conducting one or more operations described herein. Alternatively, as another example, when the second processor 602 is embodied as an executor of instructions, such as may be stored in the first common memory unit 604, the instructions may specifically configure the second processor 602 to perform one or more algorithms and operations described herein.

Thus, the second processor 602 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first common memory unit 604 may include suitable logic, circuitry, and/or interfaces that are adapted to store a set of instructions that is executable by the second processor 602 to perform predetermined operations. Additionally or alternately, the first common memory unit 604 may be configured to store the second data (received from the second RFID tags 112). In some examples, a collection of the second data is referred to as the first data. Additionally or alternatively, the first common memory unit 604 may be configured to store the unique ID associated with the first RFID tag 110. Example memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the first common memory unit 604 may be integrated with the second processor 602 on a single chip, without departing from the scope of the disclosure.

Additionally or alternatively, the first common memory unit 604 may have a first partition 620 and a second partition 622. The first partition 620 may include the one or more computer executable instructions that the second processor 602 may execute to perform the predetermined operation (e.g., operating the second RFID reader 104A). The second partition 622 may correspond to a partition that stores the first data in accordance with the EPC global standards. In an example embodiment, as discussed, the first data is collection of the second data, accordingly, the second partition 622 may store the second data. In an example embodiment, the second partition 622 may be accessible to both the second processor 602 and the first RFID tag 110. In some examples, the scope of the disclosure is not limited to the second partition storing the first data per the EPC global standards. In an example embodiment, the first data may be stored in accordance with other partition table standards.

The second communication interface 606 may correspond to a second communication interface 606 that may facilitate transmission and reception of messages and data to and from various devices. For example, through the second communication interface 606, the second RFID reader 104A may be configured to communicate with the second RFID tags 112.

Examples of the second communication interface 606 may include, but are not limited to, an antenna, an Ethernet port, a USB port, a serial port, or any other port that can be adapted to receive and transmit data. The second communication interface 606 may transmit and receive data and/or messages in accordance with the various communication protocols, such as but not limited to, EPC global, and DOD communication protocols.

Additionally or alternatively, the second communication interface 606 is communicatively coupled with the third antenna element 118. In some examples, the second communication interface 606 may be configured to transmit/receive data through the third antenna element 118 by utilizing one or more EPC global or DOD communication standards.

The second noise cancellation circuit 608 may be similar to the first noise cancellation circuit 210. For example, the second noise cancellation circuit 608 may include suitable logic and/or circuitry that may reduce the interference amongst the signals (e.g., the first signal, the second signal, the first response signal, the second response signal) received/transmitted through the fourth antenna element 120 and the third antenna element 118. Further, structural details of the first noise cancellation circuit 210 described above in conjunction with FIG. 3 are also applicable on the second noise cancellation circuit 608. Additionally, or alternatively, the embodiments applicable on the first noise cancellation circuit 210 are also applicable on the second noise cancellation circuit 608.

The second RFID reader unit 610 may be similar to the first RFID reader unit 208 structurally and functionally. For example, the second RFID reader unit 610 may include suitable logic and circuitry for reading the second data from the second RFID tags 112, as is further described in FIG. 7. To read the second data from the second RFID tags 112, the second RFID reader unit 610 may cause the third antenna element 118 to transmit the second interrogation command to the second RFID tags 112, as is further described in FIG. 7. Further, the second RFID reader unit 610 may also cause the second communication interface 606 to modulate the second interrogation command using the one or more modulation techniques (such as ASK and PJM) prior to transmitting the second interrogation command on the one or more frequency bands. In response to the second interrogation command, the second RFID reader unit 610 may receive the second data from the second RFID tags 112, as is further described in FIG. 7.

The first RFID encoder unit 612 may include suitable logic, and/or circuitry for encoding data in the second partition 622 of the first common memory unit 604. In some example embodiments, the first RFID encoder unit 612 encodes the data in the second partition 622 of the first common memory unit 604, according to one or more of Electronic Product Code (EPC) or Department of Defense (DOD) formats. For example, the first RFID encoder unit 612 may be configured to encode the second data (received from the second RFID tags 112) in the second partition 622 of the first common memory unit 604. In some examples, the scope of the disclosure is not limited to the first RFID encoder unit 612 encoding the second data in the first common memory unit 604. In an example embodiment, the first RFID encoder unit 612 may only store the second data in the first common memory unit 604 per one or more partition standards such as NTFS and/or FAT that are not encoded.

The third processor 614 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 6 as a single processor, in an embodiment, the third processor 614 may include a plurality of processors and signal processing modules. The plurality of processors may be embodied on a single electronic device or may be distributed across a plurality of electronic devices collectively configured to function as the circuitry of the first RFID tag 110. The plurality of processors may be in operative communication with each other and may be collectively configured to perform one or more functionalities of the circuitry of the first RFID tag 110, as described herein.

Whether configured by hardware, firmware/software methods, or by a combination thereof, the third processor 614 may include an entity capable of performing operations according to embodiments of the present disclosure while configured accordingly. Thus, for example, when the third processor 614 is embodied as an ASIC, FPGA or the like, the third processor 614 may include specifically configured hardware for conducting one or more operations described herein. Alternatively, as another example, when the third processor 614 is embodied as an executor of instructions, such as may be stored in the first common memory unit 604, the instructions may specifically configure the third processor 614 to perform one or more algorithms and operations described herein.

Thus, the third processor 614 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The third communication interface 616 may facilitate transmission and reception of messages and data to and from various devices. For example, through the third communication interface 616, the first RFID tag 110 may be configured to communicate with first RFID reader 102. The third communication interface 616 transmits and receives data and/or messages in accordance with the various communication protocols, such as, EPC global, and DOD communication protocols.

Additionally or alternatively, the third communication interface 616 is communicatively coupled with the fourth antenna element 120. In some examples, the third communication interface 616 may be configured to transmit/receive data through the fourth antenna element 120 by utilizing one or more EPC global or DOD communication protocols.

The I/O interface unit 618 may include suitable logic and/or circuitry that may be configured to enable communication between the first RFID tag 110 and the first common memory unit 604, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In some examples, the I/O interface unit 618 may be configured to retrieve the first data or the portion of the first data from the first common memory unit 604 by utilizing the one or more device communication protocol, as is further described in conjunction with FIGS. 8-10. Further, the I/O interface unit 618 may be configured to transform the retrieved first data, in accordance with the EPC global, DOD standards, as is further described in FIG. 8-10. Some examples of the I/O interface unit 618 may include, but not limited to, a Data Acquisition (DAQ) card, an electrical drives driver circuit, and/or the like.

The structure of the other second RFID readers 104 may be similar to the structure of the second RFID reader 104A. For example, the structure of the second RFID reader 104B may be similar to structure of the second RFID reader 104A.

The operation of the second RFID reader 104A is further described in conjunction with FIG. 7. FIG. 7 illustrates a flowchart 700 of a method for operating the second RFID reader 104A, according to one or more embodiments described herein.

At step 702, the second RFID reader 104A may include means such as the second processor 602, the second RFID reader unit 610, the second communication interface 606, and/or the like for transmitting the second interrogation command to the second RFID tags 112 through the third antenna element 118. In an example embodiment, the second RFID reader unit 610 may be configured to follow similar methodology as described in the step 402 in connection with FIG. 4 to transmit the second interrogation command.

At step 704, the second RFID reader 104A may include means such as the second processor 602, the second RFID reader unit 610, the second communication interface 606, and/or the like for receiving the second response signal through the third antenna element 118 in response to the second interrogation command. In an example embodiment, the second RFID reader unit 610 may follow similar methodologies as is described in the step 404 in connection with FIG. 4 to receive the second response signal. In an example embodiment, the second response signal may include the second data (from the second RFID tags 112).

At step 706, the second RFID reader 104A may include means such as the second processor 602, the second RFID reader unit 610, the first RFID encoder unit 612, and/or the like for storing the second data (received in the step 704) in the second partition 622 of the first common memory unit 604 as the first data. Storing the second data in the first common memory unit 604 is further described in conjunction with FIG. 8.

At step 708, the second RFID reader 104A may include means such as the first RFID tag 110, the third processor 614, the third communication interface 616, the fourth antenna element 120, and/or the like for receiving the first signal from the first RFID reader 102. In an example embodiment, the first signal may include the first interrogation command for the first RFID tag 110. Additionally or alternatively, the first interrogation command may include the unique ID of the first RFID tag 110, which the first RFID reader 102 intends to read. In some examples, as discussed above, the unique ID is utilized to differentiate amongst the first RFID tag 110 in each of the second RFID readers 104. For example, the unique ID of the first RFID tag 110 in the second RFID reader 104A is different from the unique ID of the first RFID tag 110 in the second RFID reader 104B. Further, the first interrogation command may include the address of the first common memory unit 604 from where the first RFID reader 102 wants to read the first data. Reading the first data from the first common memory unit 604 is further described in conjunction with FIG. 11.

At step 710, the second RFID reader 104A may include means such as the first RFID tag 110, the third processor 614, the third communication interface 616, the fourth antenna element 120, and/or the like for responding to the first interrogation command. In some examples, the third processor 614 may be configured to respond the first interrogation command by transmitting the first data to the first RFID reader 102. The third processor 614 may cause the third communication interface 616 to transmit the first data over the fourth antenna element 120. Additionally or alternatively, the third communication interface 616 may first modulate the first data on the first response signal. Thereafter, the third communication interface 616 may transmit the first response signal to the first RFID reader 102. Responding to the first interrogation command is further described in conjunction with FIG. 11.

In some examples, the scope of the disclosure is not limited to the performing the step 702 through the step 710 in sequence. In an example embodiment, the steps 708 and 710 may be performed in parallel to the steps 702 through 706, without departing from the scope of the disclosure. For example, the second RFID reader 104 may be configured to transmit the second interrogation command concurrent to receiving the first interrogation command. In some examples, the second RFID reader 104 may be configured to transmit the second interrogation command concurrent to transmitting the first response signal. In some examples, the second RFID reader 104 may be configured to receive the second response signal concurrent to transmitting the first response signal. The second noise cancellation circuit 608 may be configured to remove the noise generated due to interference amongst the first interrogation command, the second interrogation command, the first response signal and the second response signal, as is described above in FIG. 3.

Figure 8:
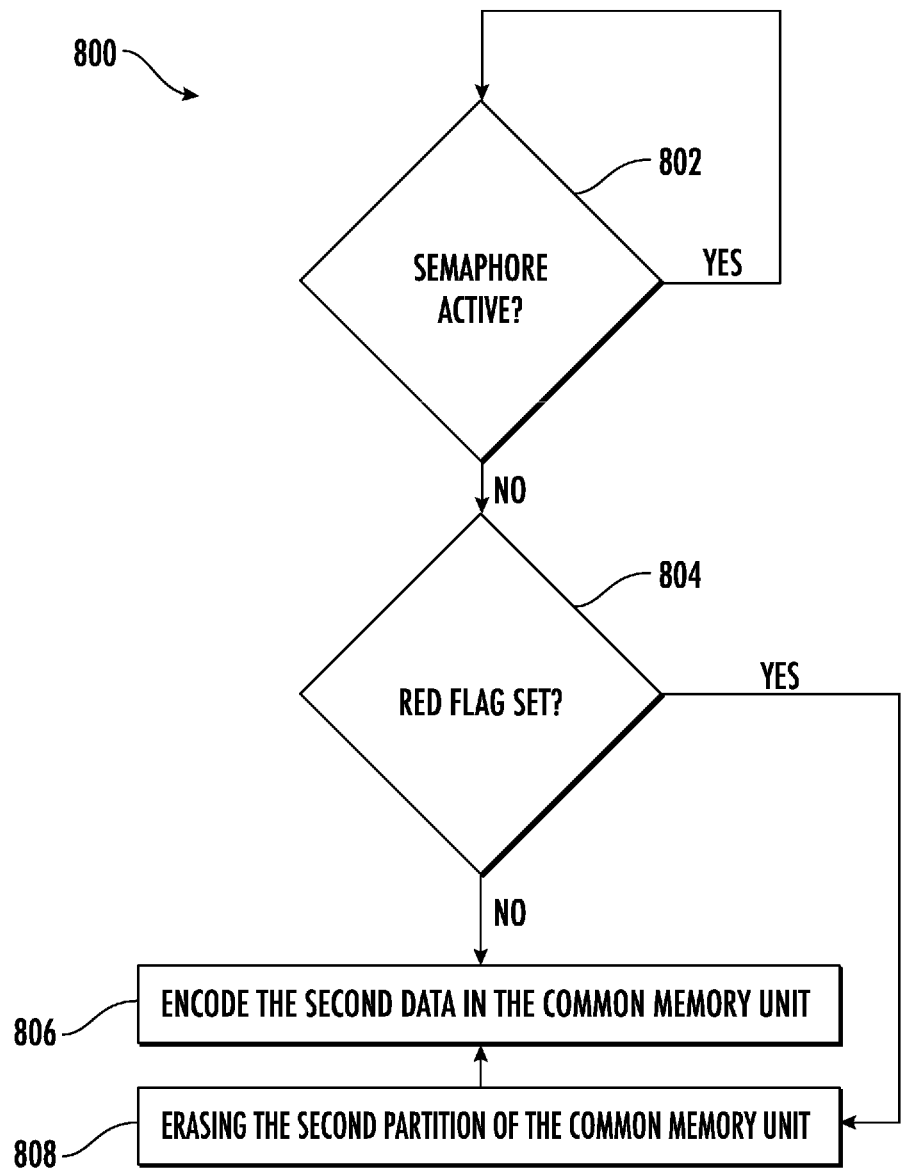
FIG. 8 illustrates a flowchart of a method for storing second data in a second partition of a first common memory unit, according to one or more embodiments described herein.

FIG. 8 illustrates a flowchart 800 of a method for storing the second data in the second partition 622 of the first common memory unit 604, according to one or more embodiments described herein.

At step 802, the second RFID reader 104A may include means such as the second processor 602, the second RFID reader unit 610, the second communication interface 606, the first RFID encoder unit 612, and/or the like for determining whether a semaphore is active. In an example embodiment, the term "semaphore" may correspond to a flag that may be utilized to the second processor 602 and the third processor 614 to access the first common memory unit 604. If the second processor 602 determines that the semaphore is active, the second processor 602 may determine that the first common memory unit 604 is being used by the third processor 614. Accordingly, the second processor 602 may be configured to repeat the step 802. However, if the second processor 602 determines that the semaphore is inactive, the second processor 602 may determine that the first common memory unit 604 is free to access. Accordingly, the second processor 602 may be configured to perform the step 804.

At step 804, the second RFID reader 104A may include means such as the second processor 602, the second RFID reader unit 610, the second communication interface 606, the first RFID encoder unit 612, and/or the like for determining whether a read flag is set. In an example embodiment, the read flag may be indicative of whether the first data in the first common memory unit 604 has been read by first RFID tag 110. For example, if the read flag is set, the read flag may indicate that the first RFID tag 110 has read the content of the first common memory unit 604. However, if the read flag us is not set, the read flag may indicate that the first RFID tag 110 has not read the content of the first common memory unit 604. Accordingly, if the second processor 602 determines that the read flag is not set, the second processor 602 may be configured to perform the step 806. However, if the second processor 602 determines that the read flag is set, the second processor 602 may be configured to perform the step 808.

In some examples, the step 804 may be optional and may not be performed by the second processor 602.

At step 806, the second RFID reader 104A may include means such as the second processor 602, the second RFID reader unit 610, the second communication interface 606, the first RFID encoder unit 612, and/or the like for encoding the second data (received from the second RFID tags 112) in the first common memory unit 604. In some examples, the first RFID encoder unit 612 may store the second data in accordance with protocols such as, but are not limited to, EPCglobal standards, DOD standards, and/or the like. In some examples, the scope of the disclosure is not limited to the storing the second data in accordance with the EPC global standards, DOD standards. In another example, the first RFID encoder unit 612 may store the second data in accordance with other partition table standards such FAT and/or NTFS.

In some examples, the scope of the disclosure is not limited to the second RFID encoder unit 1302 to directly write the second data in the first common memory unit 604. In an example embodiment, the first RFID encoder unit 612 may cause the first RFID tag 110 to write the second data in the first common memory unit 604. For example, the first RFID encoder unit 612 may transmit the "Write" command along with the second data to the first RFID tag 110, in accordance with EPC global standards. The "Write" command may cause the first RFID tag 110 to write the second data in the second partition 622 in the first common memory unit 604. Writing the second data by the first RFID tag 110 is further described in conjunction with FIG. 9.

At step 808, the second RFID reader 104A may include means such as the second processor 602, the second RFID reader unit 610, the second communication interface 606, the first RFID encoder unit 612, and/or the like for erasing the second partition 622 of the first common memory unit 604. Thereafter, the second processor 602 may be configured to perform the step 806. In some examples, the step 808 may be optional.

Figure 9:
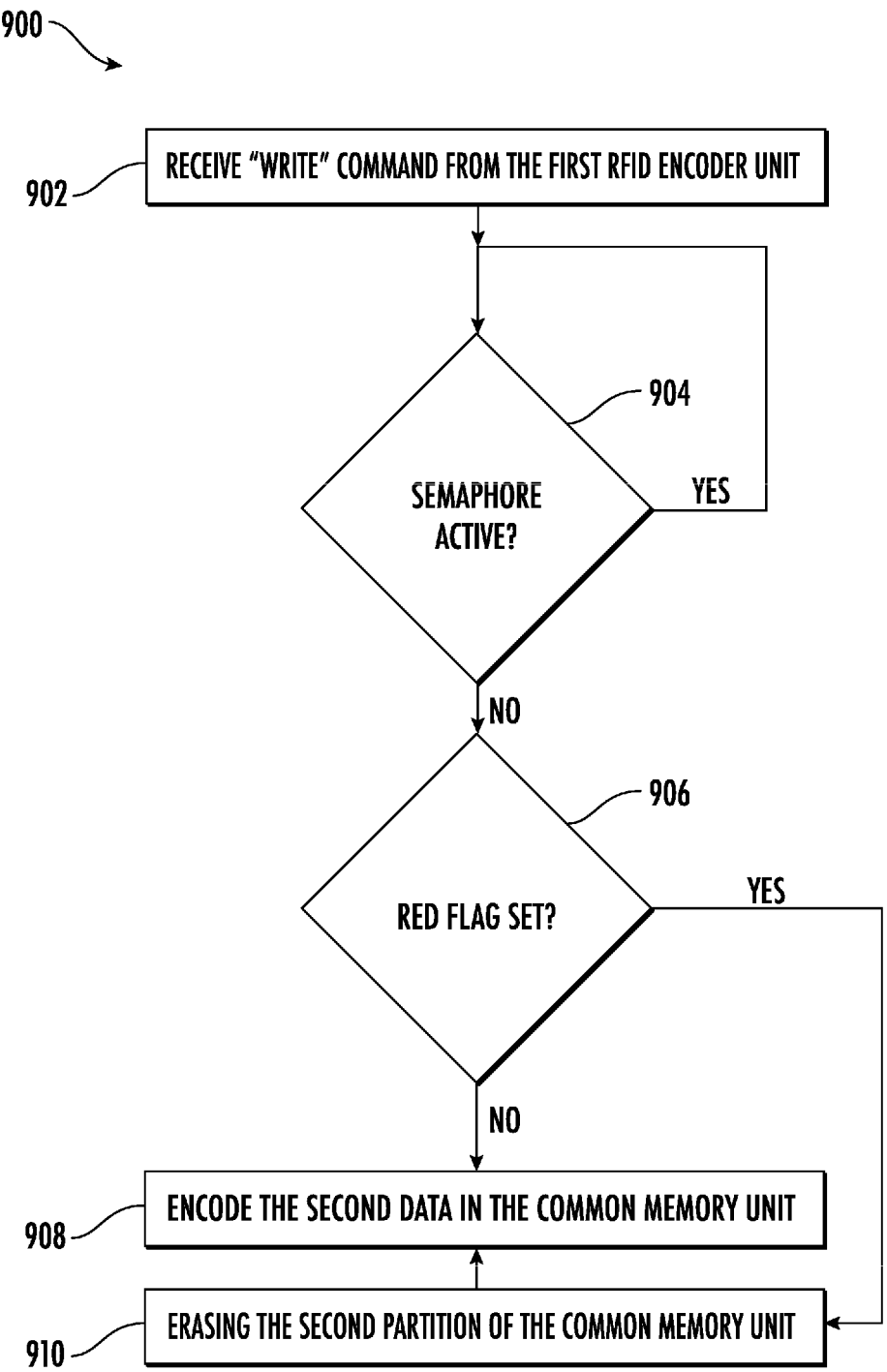
FIG. 9 illustrates a flowchart of a method for encoding the second data in the second partition of the first common memory unit, according to one or more embodiments described herein.

FIG. 9 illustrates a flowchart 900 of a method for encoding the second data in the second partition 622 of the first common memory unit 604 according to one or more embodiments described herein.

At step 902, the second RFID reader 104A may include means such as the first RFID tag 110, the third processor 614, the I/O interface unit 618, and/or the like for receiving the "Write" command from the first RFID encoder unit 612. As discussed in the step 806, the first RFID encoder unit 612 may transmit the "Write" command to the first RFID tag 110.

At step 904, the second RFID reader 104A may include means such as the first RFID tag 110, the third processor 614, the I/O interface unit 618, and/or the like for determining, in response to receiving the "Write" command, whether the semaphore is active. In an example embodiment, the third processor 614 may utilize similar methodology as described in step 802 to determine whether the semaphore is active. If the third processor 614 determines that the semaphore is active, the third processor 614 may determine that the first common memory unit 604 is being used by the second processor 602. Accordingly, the third processor 614 may be configured to repeat the step 906. However, if the third processor 614 determines that the semaphore is inactive, the third processor 614 may be configured to perform the step 906.

At step 906, the second RFID reader 104A may include means such as the first RFID tag 110, the third processor 614, the I/O interface unit 618, and/or the like for determining whether a read flag is set. In an example embodiment, the third processor 614 may use the similar methodology, as described in the step 804, to determine whether the read is set. If the third processor 614 determines that the read flag is not set, the third processor 614 may be configured to perform the step 908. However, if the third processor 614 determines that the read flag is set, the third processor 614 may be configured to perform the step 910. In some examples, the step 906 may be optional and may not be performed by the third processor 614.

At step 908, the second RFID reader 104A may include means such as the first RFID tag 110, the third processor 614, the I/O interface unit 618, and/or the like for storing the second data in the second partition 622 of the first common memory unit 604. Further, the third processor 614 may store the second data in accordance with protocols such as, but are not limited to, EPCglobal standards, DOD standards, and/or the like. In another example, the third processor 614 may store the second data in accordance with other partition table standards such FAT and/or NTFS. Storing of the second data, by the first RFID tag 110, in in accordance with the other partition table standard is further described in conjunction with FIG. 10.

At step 910, the second RFID reader 104A may include means such as the first RFID tag 110, the third processor 614, the I/O interface unit 618, and/or the like for erasing the second partition 622 of the first common memory unit 604. Thereafter, the third processor 614 may be configured to perform the step 908. In some examples, the step 910 may be optional and may not be performed by the third processor 614.

In some examples, the scope of the disclosure is not limited to using semaphores to get access to the first common memory unit 604. In an example embodiment, the third processor 614 may other techniques of getting access to the first common memory unit 604. For example, the third processor 614 may interrupt the second processor 602 prior to accessing the first common memory unit 604. Such method of accessing the first common memory unit 604 is further described in conjunction with FIG. 10.

Figure 10:
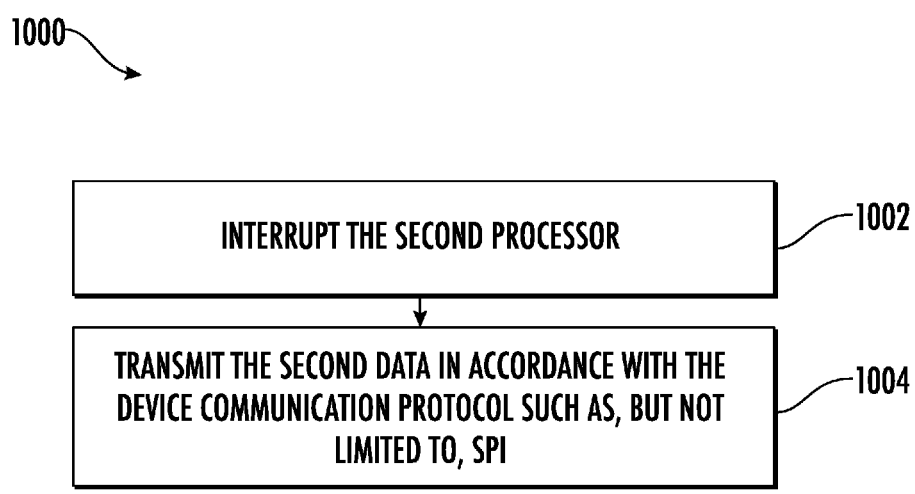
FIG. 10 illustrates a flowchart of a method for storing the second data in the first common memory unit, according to one or more embodiments described herein.

FIG. 10 illustrates a flowchart 1000 of a method for storing the second data in the first common memory unit 604, according to one or more embodiments described herein.

At step 1002, the second RFID reader 104A may include means such as the first RFID tag 110, the third processor 614, the I/O interface unit 618, and/or the like for interrupting, in response to receiving the "Write command", the second processor 602. In an example embodiment, the third processor 614 may be configured to transmit the interrupt command to the second processor 602. Upon receiving the interrupt command, the second processor 602 may halt the execution of the instructions. Accordingly, the second processor 602 releases the access to the first common memory unit 604.

At step 1004, the second RFID reader 104A may include means such as the first RFID tag 110, the third processor 614, the I/O interface unit 618, and/or the like for transmitting the second data (received along with the "Write command") in accordance with the device communication protocol (such as SPI) to the first common memory unit 604. In some examples, the I/O interface unit 618 may transmit the second data along with the memory address at which the second data is to be stored in the first common memory unit 604. Upon receiving the second data, the first common memory unit 604 may be configured to store the second data at the memory address. In an example embodiment, the stored second data is referred to as the first data. The following table illustrates an example first data stored in the first common memory unit 604:

TABLE 3

Example first data stored in the first common memory unit 604

| Memory Address | Tag ID | Second Data |
|---|---|---|
| 12AD | 1234 | Data-1 |
| 34BD | 5678 | Data-2 |
| 89AD | 1357 | Data-3 |
| 78BC | 2468 | Data-4 |

Table 3 depicts that at the memory address "12AD" where second data received from the Tag ID "1234" is stored. Similarly, at the memory address "34BD", the second data received from the Tag ID "5678" is stored.

Figure 11:
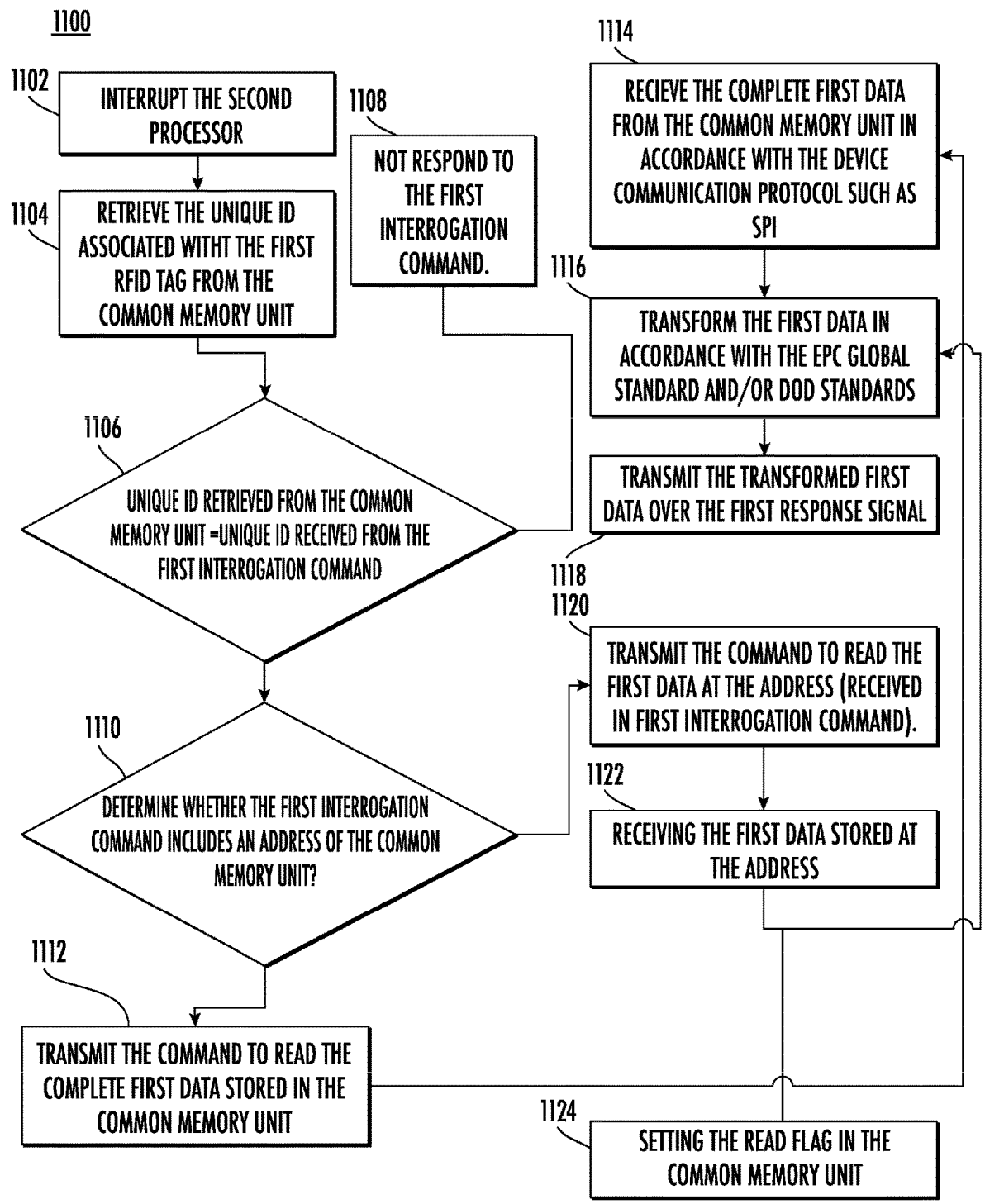
FIG. 11 illustrates a flowchart of a method for responding to the first interrogation command, according to one or more embodiments described herein.

FIG. 11 illustrates a flowchart 1100 of a method for responding to the first interrogation command, according to one or more embodiments described herein.

At step 1102, the second RFID reader 104A may include means such as the first RFID tag 110, the third processor 614, the I/O interface unit 618, and/or the like for interrupting the second processor 602. In an example embodiment, the third processor 614 may utilize similar methodologies as described in the step 1002 to interrupt the second processor 602.

At step 1104, the second RFID reader 104A may include means such as the first RFID tag 110, the third processor 614, the I/O interface unit 618, and/or the like for retrieving the unique ID associated with the first RFID tag 110 from the first common memory unit 604. As described above, the unique ID associated with the first RFID tag 110 may serve as an identification or identifier for first RFID tag 110 and/or the corresponding second RFID reader 104A. For example, the unique ID associated with the first RFID tag 110 may be a corresponding RFID tag identifier and/or a RFID reader identifier. In some examples, the unique ID may be stored at the predetermined location in the first common memory unit 604. For example, the unique ID associated with the first RFID tag is stored at the base address "0000" of the first common memory unit 604. Accordingly, the third processor 614 may be configured to retrieve the unique ID from the base address of the first common memory unit 604.

At step 1106, the second RFID reader 104A may include means such as the first RFID tag 110, the third processor 614, the I/O interface unit 618, and/or the like for comparing the unique ID retrieved from the first common memory unit 604 with the unique ID received from the first interrogation command. If the third processor 614 determines that the unique ID, retrieved from the first common memory unit 604, matches the unique ID received from the first interrogation command, the third processor 614 may determine that the first interrogation command is intended for the first RFID tag 110 in the second RFID reader 104A. Accordingly, the third processor 614 may be configured to perform the step 1110. However, if the third processor 614 determines that the unique ID, retrieved from the first common memory unit 604, does not match the unique ID received from the first interrogation command, the third processor 614 may determine that the first interrogation command is not intended for the first RFID tag 110 in the second RFID reader 104A. Accordingly, the third processor 614 may be configured to perform the step 1108.

At step 1108, the second RFID reader 104A may include means such as the first RFID tag 110, the third processor 614, the I/O interface unit 618, and/or the like for not responding to the first interrogation command.

At step 1110, the second RFID reader 104A may include means such as the first RFID tag 110, the third processor 614, the I/O interface unit 618, and/or the like for determining whether the first interrogation command includes an address of the first common memory unit 604 from which the first data is to be read. If the third processor 614 determines that the first interrogation command does not include the address, the third processor 614 may be configured to perform the step 1112. However, if the third processor 614 determines that the first interrogation command includes the address, the third processor 614 may be configured to perform the step 1120.

At step 1112, the second RFID reader 104A may include means such as the first RFID tag 110, the third processor 614, the I/O interface unit 618, and/or the like for transmitting the command to read the complete first data stored in the first common memory unit 604. In an example embodiment, the third processor 614 may be configured to transmit the command, through the I/O interface unit 618, in accordance with the device communication protocols such as SPI.

At step 1114, the second RFID reader 104A may include means such as the first RFID tag 110, the third processor 614, the I/O interface unit 618, and/or the like for receiving the complete first data from the first common memory unit 604 in accordance with the device communication protocol such as SPI. In some examples, the first data, received from the first common memory unit 604, may be in format that is in accordance with the device communication protocol (with which the first data was transmitted to the third processor 614).

Thereafter, at step 1116, the second RFID reader 104A may include means such as the first RFID tag 110, the third processor 614, the I/O interface unit 618, and/or the like for transforming the first data in accordance with the EPC global standard and/or DOD standards. Further, at step 1118, the second RFID reader 104A may include means such as the first RFID tag 110, the third processor 614, the I/O interface unit 618, and/or the like for transmitting the transformed first data over the first response signal through the fourth antenna element 120.

At step 1120, the second RFID reader 104A may include means such as the first RFID tag 110, the third processor 614, the I/O interface unit 618, and/or the like for transmitting the command to read the first data at the address (received in first interrogation command). In an example embodiment, the third processor 614 may be configured to transmit the command, through the I/O interface unit 618, in accordance with the device communication protocols such as SPI. In some examples, the command may include the address from where the first data is to be read. At step 1122, the second RFID reader 104A may include means such as the first RFID tag 110, the third processor 614, the I/O interface unit 618, and/or the like for receiving the first data stored at the address. Thereafter, the third processor 614 may be configured to perform the step 1116.

Additionally, or alternately, at step 1124, the second RFID reader 104A may include means such as the first RFID tag 110, the third processor 614, the I/O interface unit 618, and/or the like for setting the read flag in the first common memory unit 604. The read flag may indicate that the first data in the first common memory unit 604 has been read by the first RFID tag 110 and has been transmitted to the first RFID reader 102.

Figure 12:
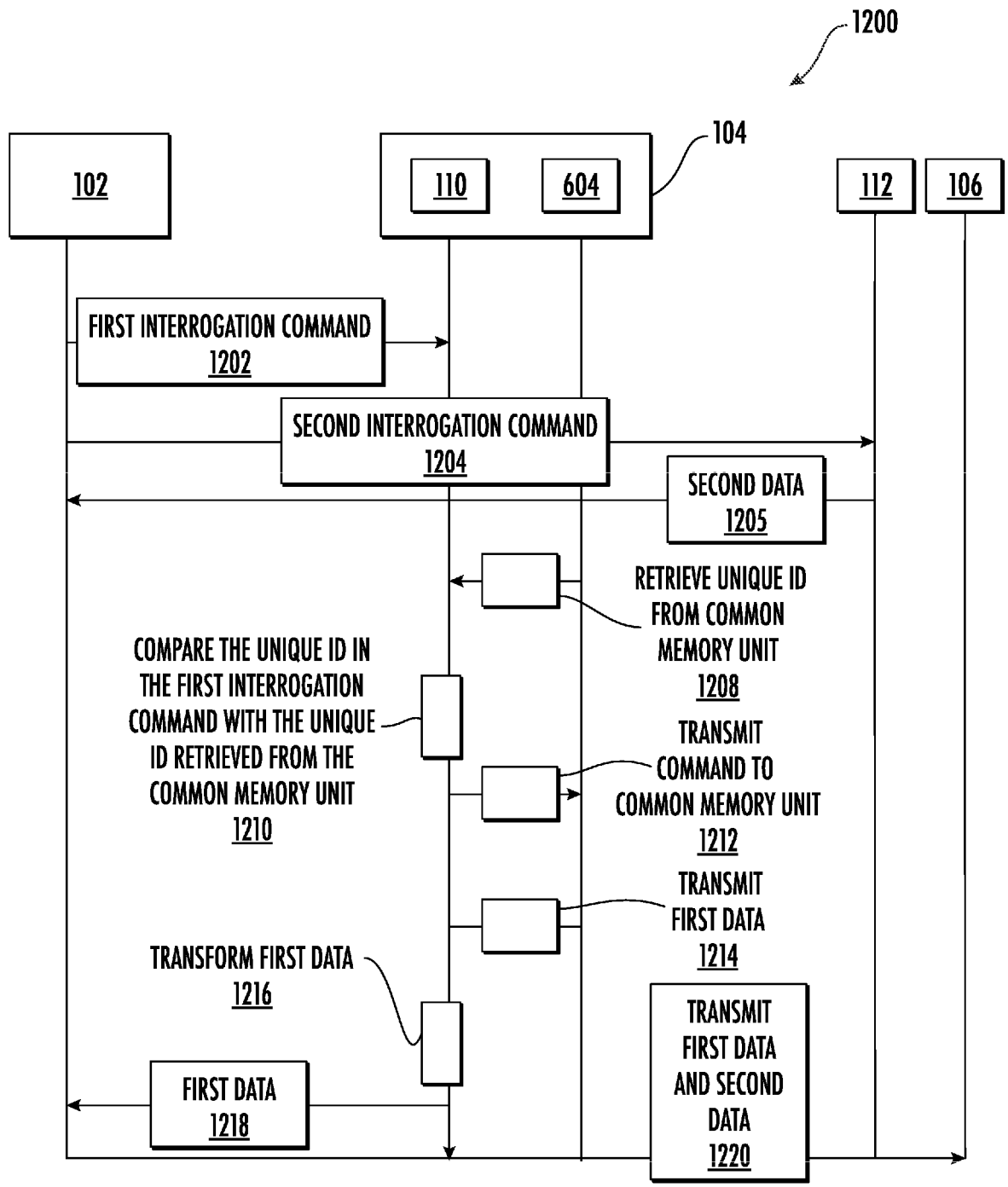
FIG. 12 illustrates a message flow diagram illustrating communication between the first RFID reader, the second RFID reader, and the central server, according to one or more embodiments described herein.

FIG. 12 illustrates a message flow diagram 1200 illustrating communication between the first RFID reader 102, the second RFID reader 104A, the second RFID tag 112, and the central server 106, according to one or more embodiments described herein.

The first RFID reader 102 transmits the first interrogation command over the first signal to the second RFID reader 104A (as depicted by 1202). Concurrently or subsequently, the first RFID reader 102 transmits the second interrogation command to the second RFID tags 112 (as depicted 1204). In response to the second interrogation command, the first RFID reader 102 receives the second data from the second RFID tags 112 (as depicted by 1205).

In the second RFID reader 104A, in response to the reception of the first interrogation command, the third processor 614 may be configured to retrieve the unique ID stored in the first common memory unit 604 (as depicted by 1208). Further, the third processor 614 compares the unique ID in the first interrogation command with the unique ID retrieved from the first common memory unit 604 (as depicted by 1210). If unique ID from the first interrogation command matches the unique ID retrieved from the first common memory unit 604, the third processor 614 may be configured to transmit the command to the first common memory unit 604 (e.g., using SPI protocol) to retrieve the first data (as depicted by 1212). Upon receiving the command, the first common memory unit 604 transmits the first data to the third processor 614 (as depicted by 1214). The third processor 614 transforms the first data in accordance with the EPC global and/or DOD formats (as depicted by 1216). Thereafter, the third processor 614 may transmit the first data to the first RFID reader 102 through the fourth antenna element 120 (as depicted by 1218).

Upon receiving the first data, the first RFID reader 102 transmits the first data and the second data to the central server 106 (as depicted by 1220). Though displayed as separate communication channels, in some examples, the scope of the disclosure is not limited to the receiving first data 1218 and transmitting second interrogation command 1204 separately. In an example embodiment, the first RFID reader 102 may be configured to transmit the second interrogation command 1204 and the receive the first data 1218 concurrently. In another example, the first RFID reader 102 may transmit the first interrogation command 1202 and the second interrogation command 1204 concurrently.

In some examples, the scope of the disclosure is not limited to the first RFID reader 102 interrogating the first RFID tag 110 in the second RFID reader 104A. In an example embodiment, the second RFID reader 104A may be configured to push the first data to the first RFID reader 102, without departing from the scope of the disclosure. In such an embodiment, the second RFID reader 104A may be devoid of the first RFID tag 110. Further, in such an embodiment, the first RFID reader 102 may include the first RFID tag 110. A block diagram such first RFID reader 102 and the second RFID readers 104 is further illustrated in FIG. 13 and FIG. 14 respectively.

Figure 13:
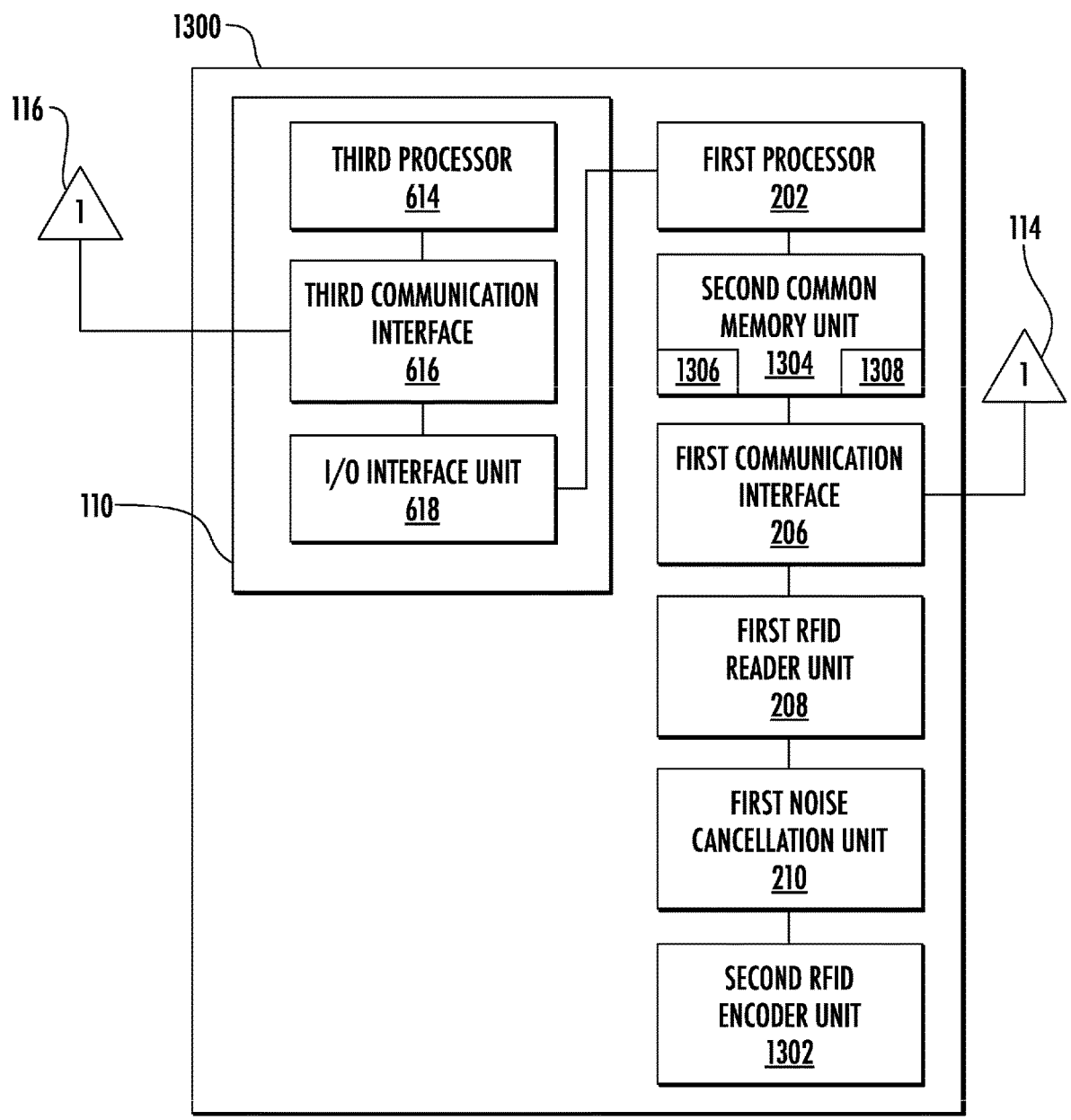
FIG. 13 illustrates a block diagram of a third RFID reader, according to one or more embodiments described herein

FIG. 13 illustrates a block diagram of a third RFID reader 1300, according to one or more embodiments described herein. In an example embodiment, the third RFID reader 1300 may be similar to the first RFID reader 102 in one or more aspects. For example, the third RFID reader 1300 includes the first processor 202, the first communication interface 206, the first RFID reader unit 208, the first noise cancellation circuit 210, the first antenna element 114, and the second antenna element 116. Additionally or alternatively, the third RFID reader 1300 includes the first RFID tag 110, a second RFID encoder unit 1302, and a second common memory unit 1304. The structure and operation of the first RFID tag 110 and the second common memory unit 1304 is similar to that described in conjunction with FIGS. 6-11. For example, the second common memory unit 1304 includes a third partition 1306 and a fourth partition 1308. The third partition 1306 is configured to store the one or more computer readable instructions that may be executable by the first processor 202. Further, the fourth partition 1308 may be similar to the second partition 622. For example, the fourth partition 1308 may be configured to store the second data (received from the second RFID tags 112) as the first data.

In some examples, in the third RFID reader 1300, the first antenna element 114 of the third RFID reader 1300 is coupled to the first RFID tag 110, while the second antenna element 116 of the third RFID reader 1300 is coupled to the first communication interface 206.

The second RFID encoder unit 1302 may be similar to the first RFID encoder unit 612. For example, the second RFID encoder unit 1302 may include suitable logic and circuitry for encoding data in the fourth partition 1308 of the second common memory unit 1304. In some example embodiments, the second RFID encoder unit 1302 encodes data in the fourth partition 1308 of the second common memory unit 1304, according to one or more of Electronic Product code (EPC) or Department of Defense (DOD) formats. For example, the second RFID encoder unit 1302 may be configured to encode the first data (received from the second RFID reader 104) in the fourth partition 1308 of the second common memory unit 1304. Additionally, the second RFID encoder unit 1302 may be configured to encode the second data (received from the second RFID tags 112) in the fourth partition 1308 of the second common memory unit 1304. In some examples, the scope of the disclosure is not limited to the second RFID encoder unit 1302 encoding the second data and the first data in the second common memory unit 1304. In an example embodiment, the first RFID encoder unit 612 may only store the first data and the second data in the second common memory unit 1304.

Figure 14:
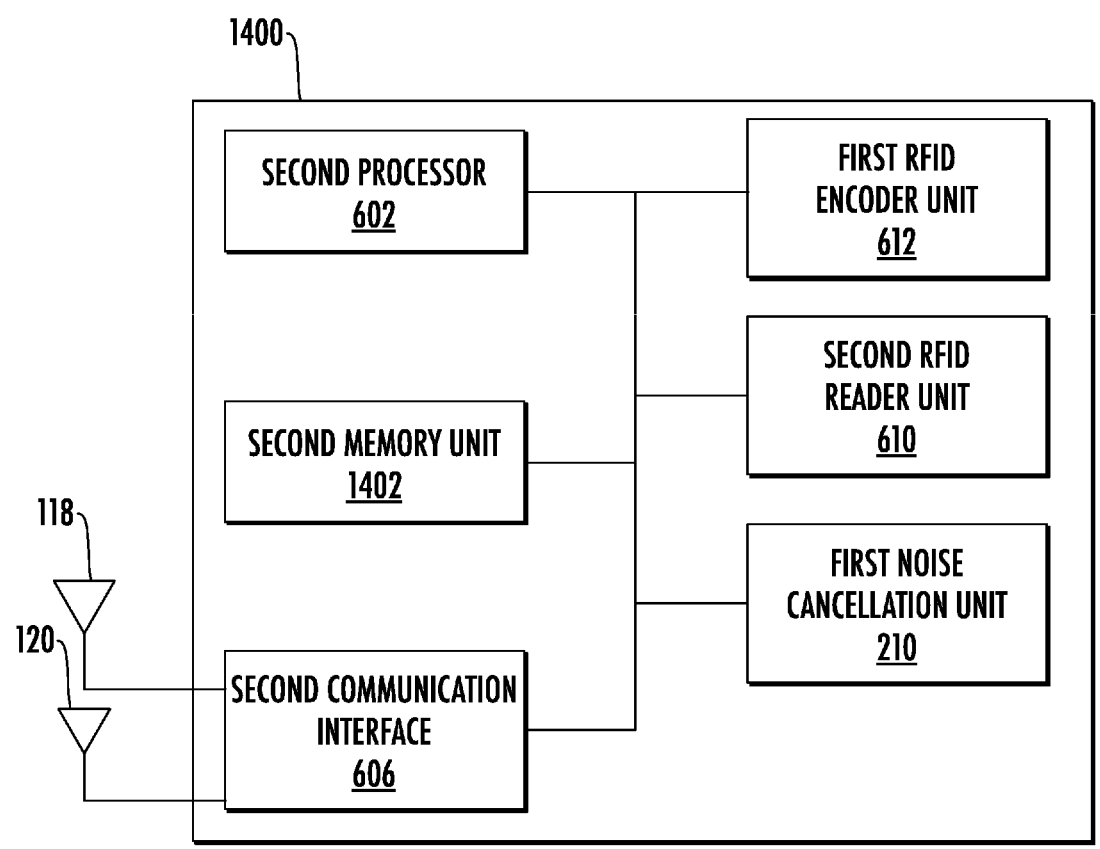
FIG. 14 illustrates the block diagram of a fourth RFID reader, according to one or more embodiments described herein.

FIG. 14 illustrates the block diagram of a fourth RFID reader 1400, according to one or more embodiments described herein. In an example embodiment, the fourth RFID reader 1400 may be similar to the second RFID reader 104 in one or more aspects. For example, the fourth RFID reader 1400 includes the second processor 602, the second communication interface 606, the second RFID reader unit 610, the first RFID encoder unit 612, the third antenna element 118 and the fourth antenna element 120. Additionally, the fourth RFID reader 1400 includes a second memory unit 1402. In some examples, the fourth RFID reader 1400 is devoid of the first RFID tag 110 and the first common memory unit 604. In some examples, the second memory unit 1402 may be structurally and operationally similar to the first memory unit 204.

In some examples, in the fourth RFID reader 1400, the third antenna element 118 and the fourth antenna element 120 are coupled to the second communication interface 606. The operation of the fourth RFID reader 1400 is further described in conjunction with FIG. 15.

Figure 15:
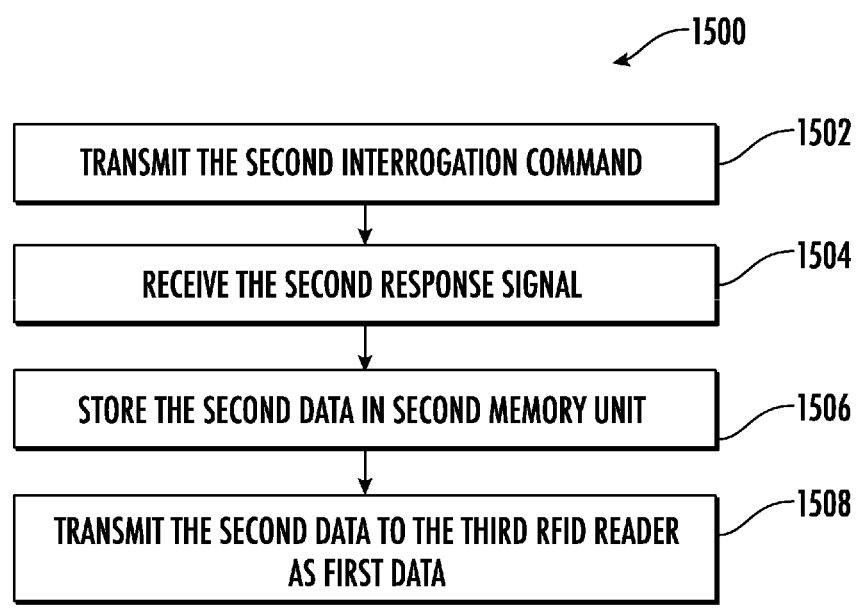
FIG. 15 illustrates a flowchart of a method for operating the fourth RFID reader, according to one or more embodiments described herein.

FIG. 15 illustrates a flowchart 1500 of a method for operating the fourth RFID reader 1400, according to one or more embodiments described herein.

At step 1502, the fourth RFID reader 1400 may include means such as the second processor 602, the second RFID reader unit 610, the second communication interface 606, and/or the like for transmitting the second interrogation command to the second RFID tags 112 through the third antenna element 118. In some examples, the second processor 602 may utilize similar methodology as described in the step 702 to transmit the second interrogation signal. At step 1504, the fourth RFID reader 1400 may include means such as the second processor 602, the second RFID reader unit 610, the second communication interface 606, and/or the like for receiving the second response signal, through the third antenna element 118, in response to the second interrogation command. In an example embodiment, the second response signal may include the second data (from the second RFID tags 112). In some examples, the second processor 602 may utilize similar methodology as described in the step 704 to receive the second response signal.

At step 1506, the fourth RFID reader 1400 may include means such as the second processor 602, the second RFID reader unit 610, the first RFID encoder unit 612, and/or the like for storing the second data in the second memory unit 1402. In some examples, the second processor 602 may utilize similar methodology as described in the step 706 to store the second data. At step 1508, the fourth RFID reader 1400 may include means such as the second processor 602, the second RFID reader unit 610, the first RFID encoder unit 612, the second communication interface 606, and/or the like for transmitting the second data, as the first data, to the third RFID reader 1300 through the fourth antenna element 120. In an example embodiment, the first RFID encoder unit 612 may be configured to transmit the first data along with a "Write" command to the third RFID reader 1300. In some examples, the "Write" command is transmitted in accordance with encoding protocols listed in the EPC global and/or DOD standards. In some examples, the first RFID encoder unit 612 may be configured to modulate the "Write" command along with the first data over an encoding signal. Thereafter, the first RFID encoder unit 612 transmits the encoding signal to the third RFID reader 1300.

In some examples, because the system environment 100 may include multiple fourth RFID reader 1400, accordingly, the first RFID encoder unit 612 may transmit the encoding signal in accordance with one or more multiple access schemes such as, but not limited to, Time Division Multiple Access (TDMA), Code Division Multiple Access (CDMA), and/or the like.

Figure 16:
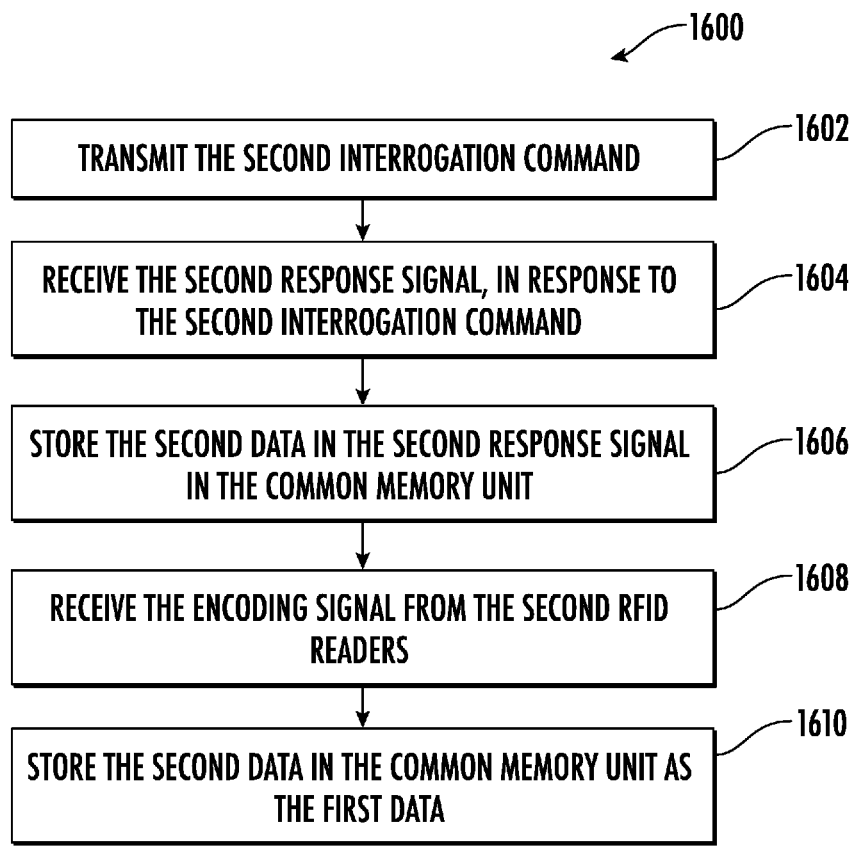
FIG. 16 illustrates a flowchart of a method for operating the third RFID reader, according to one or more embodiments described herein.

FIG. 16 illustrates a flowchart 1600 of a method for operating the third RFID reader 1300, according to one or more embodiments described herein.

At step 1602, the third RFID reader 1300 may include means, such as the first processor 202, the first communication interface 206, the first RFID reader unit 208, the second antenna element 116, and/or the like for transmitting the second interrogation command to the second RFID tags 112. The first processor 202 may be configured to perform similar methodology as described in the step 402 to transmit the second interrogation signal. At step 1604, the third RFID reader 1300 may include means such as the first processor 202, the first communication interface 206, the first RFID reader unit 208, the second antenna element 116, and/or the like for receiving the second response signal (through the second antenna element 116), in response to the second interrogation command (transmitted over the second signal). In an example embodiment, the first processor 202 may perform similar methodology as is described in the step 404 to receive the second response signal.

At step 1606, the third RFID reader 1300 may include means such as the first processor 202, the first communication interface 206, the first RFID reader unit 208, the second RFID encoder unit 1302, and/or the like for storing the second data in the second response signal in the second common memory unit 1304. In an example embodiment, the second RFID encoder unit 1302 may be configured to perform similar methodology as is described in the FIG. 8 and FIG. 9 to store the second data in the second common memory unit 1304.

At step 1608, the third RFID reader 1300 may include means such as the first RFID tag 110, the third processor 614, the third communication interface 616, the I/O interface unit 618, and/or the like for receiving the encoding signal from the third RFID readers 1300 through the first antenna element 114. In an example embodiment, the encoding signal may include the first data. At step 1610, the third RFID reader 1300 may include means such as the first RFID tag 110, the third processor 614, the third communication interface 616, the I/O interface unit 618, the second RFID encoder unit 1302, and/or the like for storing the first data in the second common memory unit 1304. In an example embodiment, the third processor 614 may utilize similar methodologies, as is described in the FIG. 8 and FIG. 9, to store the first data in the second common memory unit 1304.

In some examples, the scope of the disclosure is not limited to the first RFID reader 102 and the second RFID readers 104 communicating wirelessly with each other. In some examples, the first RFID reader 102 may be coupled to each of the second RFID readers 104 through communication cables. In such an embodiment, the first RFID reader 102 and the second RFID readers 104 transmit the first signal, the second signal, the first response signal, the second response signal over the communication cables.

Figure 17:
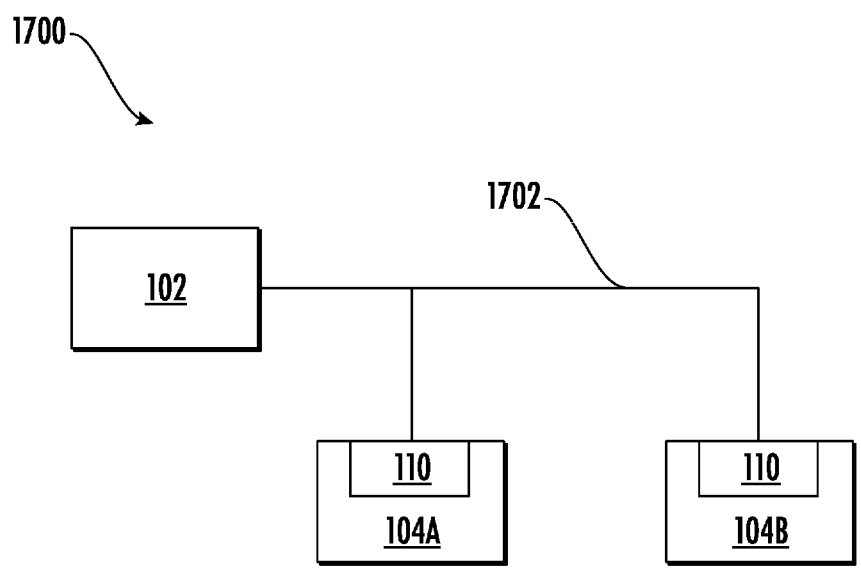
FIG. 17 illustrates a system environment, according to one or more embodiments described herein.

FIG. 17 illustrates a system environment 1700, according to one or more embodiments described herein. The system environment 1700 includes the first RFID reader 102 and the second RFID readers 104. The second RFID readers 104 are coupled to the first RFID reader 102 through a communication cable 1702. Some examples of the communication cable 1702 may include but are not limited to a RF coaxial cable, and/or the like.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

It is noted that each block of the flowchart, and combinations of blocks in the flowchart, may be implemented by various means such as hardware, firmware, circuitry and/or other devices associated with execution of software including one or more computer program instructions. For example, one or more of the procedures described above may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

The invention claimed is:

1. A radio-frequency identification (RFID) reader comprising:
   a first antenna element, wherein the first antenna element is configured to facilitate a first transmission of a first interrogation command to a first RFID tag associated with a second RFID reader, and in response to the first transmission of the first interrogation command, receive a first response signal; and
   a second antenna element, wherein the second antenna element is configured to facilitate a second transmission of a second interrogation command to one or more second RFID tags, wherein transmitting the second interrogation command is concurrent to receiving the first response signal or transmitting the first interrogation command.

2. The RFID reader of claim 1, wherein the second antenna element is further configured to receive a second response signal from the one or more second RFID tags.

3. The RFID reader of claim 2, wherein the RFID reader further comprises a communication module configured to transmit data received in the first response signal and/or the second response signal to a central server.

4. The RFID reader of claim 3, wherein the central server is configured to monitor availability of one or more assets based on data received from the RFID reader.

5. The RFID reader of claim 1, further comprising a first noise cancellation circuit configured to generate a first noise free response signal.

6. The RFID reader of claim 1, further comprising a second noise cancellation circuit configured to generate a second noise free response signal.

7. The RFID reader of claim 1, wherein the RFID reader further comprises a memory unit configured to store a list of second RFID readers along with respective unique IDs.

8. The RFID reader of claim 7, wherein the RFID reader is further configured to select the second RFID reader out of the list of second RFID readers prior to transmitting the first interrogation command.

9. The RFID reader of claim 7, wherein the memory unit is further configured to store a first data obtained from the first RFID tag and/or a second data obtained from the one or more second RFID tags.

10. The RFID reader of claim 1, wherein the RFID reader and the second RFID reader communicate wirelessly.

11. The RFID reader of claim 1, wherein the RFID reader is coupled to the second RFID reader through a communication cable.

12. The RFID reader of claim 7, wherein the RFID reader comprises a first processor, a first communication interface, and a first RFID reader unit to determine whether the first interrogation command has been transmitted to each of the list of second RFID readers.

13. The RFID reader of claim 1, wherein the first antenna element and/or the second antenna element has 5 dbm output power and provide 35 dbm effective isotropic radiated power (EIRP).

14. The RFID reader of claim 1, wherein the one or more second RFID tags are positioned on one or more assets to be tracked.

15. The RFID reader of claim 1, wherein the first interrogation command includes a unique ID and an address associated with a second memory unit of the second RFID reader.

16. The RFID reader of claim 15, wherein the first RFID tag is configured to:
   retrieve a unique ID associated with the second RFID reader from the second memory unit;

compare the unique ID retrieved from the second memory unit with the unique ID received in the first interrogation command; and in response to determining that the unique ID retrieved from the second memory unit matches the unique ID received in the first interrogation command, transmit the first response signal.

17. The RFID reader of claim 15, wherein the first RFID tag is configured to interrupt the second memory unit to retrieve data in accordance with a first protocol.

18. The RFID reader of claim 17, wherein the first RFID tag is configured to transform the retrieved data in accordance with a second protocol, wherein the second protocol is utilized to transmit the first response signal to the RFID reader, wherein the first response signal comprises the transformed data.

19. A system comprising:
 a first radio-frequency identification (RFID) reader;
 a second RFID reader comprising a first RFID tag; and
 one or more second RFID tags;
 wherein the first RFID reader comprises:
  a first antenna element configured to:
   facilitate a first transmission of a first interrogation command to the first RFID tag, and
   in response to the first transmission of the first interrogation command, receive a first response signal; and
  a second antenna element configured to:
   facilitate a second transmission of a second interrogation command to the one or more second RFID tags, wherein transmitting the second interrogation command is concurrent to receiving the first response signal or transmitting the first interrogation command.

20. The system of claim 19, wherein the first RFID reader further comprises a communication module configured to transmit data received in the first response signal to a central server.

* * * * *